(12) United States Patent
Beauchamp et al.

(10) Patent No.: US 6,621,505 B1
(45) Date of Patent: Sep. 16, 2003

(54) DYNAMIC PROCESS-BASED ENTERPRISE COMPUTING SYSTEM AND METHOD

(75) Inventors: Robert E. Beauchamp, Austin, TX (US); Brian L. Baker, Austin, TX (US); James D. Skufca, Austin, TX (US); Brett K. Wooldridge, Austin, TX (US)

(73) Assignee: Journee Software Corp., Austin, TX (US)

(*) Notice: Subject to any disclaimer, the term of this patent is extended or adjusted under 35 U.S.C. 154(b) by 0 days.

(21) Appl. No.: 09/164,226

(22) Filed: Sep. 30, 1998

Related U.S. Application Data

(60) Provisional application No. 60/060,512, filed on Sep. 30, 1997.

(51) Int. Cl.[7] .................................................. G09G 5/00
(52) U.S. Cl. ....................... 345/764; 345/765; 345/700; 709/329
(58) Field of Search ........................ 709/203, 217–219, 709/329; 705/416, 411, 1; 345/156–157, 326, 334–335, 346, 552, 700, 764, 765; 712/200

(56) References Cited

U.S. PATENT DOCUMENTS

| | | | | |
|---|---|---|---|---|
| 5,651,108 A | * | 7/1997 | Cain et al. ................... | 340/345 |
| 5,675,752 A | * | 10/1997 | Scott et al. .................. | 345/333 |
| 5,675,753 A | * | 10/1997 | Hansen et al. ............... | 345/333 |
| 5,734,907 A | * | 3/1998 | Jarossay et al. ............... | 717/8 |
| 5,774,887 A | * | 6/1998 | Wolff et al. ..................... | 707/1 |
| 5,787,470 A | * | 7/1998 | DeSimone et al. ......... | 711/124 |
| 5,796,393 A | * | 8/1998 | MacNaughton et al. .... | 345/329 |
| 5,835,712 A | * | 11/1998 | DuFresne ................... | 709/203 |
| 5,848,271 A | * | 12/1998 | Caruso et al. .............. | 712/220 |
| 5,859,972 A | * | 1/1999 | Subramaniam et al. ..... | 709/203 |
| 5,862,322 A | * | 1/1999 | Anglin et al. ................. | 714/57 |
| 5,862,325 A | * | 1/1999 | Reed et al. .................. | 709/201 |
| 5,893,110 A | * | 4/1999 | Weber et al. ............... | 707/104 |
| 5,930,768 A | * | 7/1999 | Hooban ....................... | 705/27 |
| 5,960,411 A | * | 9/1999 | Hartman et al. ............... | 705/26 |
| 5,963,915 A | * | 10/1999 | Kirsch ......................... | 705/26 |
| 6,026,433 A | * | 2/2000 | D'Arlach et al. ........... | 709/217 |
| 6,069,628 A | * | 5/2000 | Farry et al. .................. | 345/835 |
| 6,078,325 A | * | 6/2000 | Jolissaint et al. ........... | 345/839 |

OTHER PUBLICATIONS

XML, JAVA, and the future of the Web, Bosak, J., Sun Microsystems, Mar. 10, 1997, pp. 1–9.*

* cited by examiner

*Primary Examiner*—Mark R. Powell
*Assistant Examiner*—Beatriz Prieto
(74) *Attorney, Agent, or Firm*—Robert C. Kowert; Meyertons, Hood, Kilvin, Kowert & Goetzel, P.C.

(57) ABSTRACT

Computer processes for carrying out almost any process may be defined as a series of steps using a plurality of standardized user-interface screens. These standardized interface screens may be linked together in predetermined orders to implement on a client computer activities for which the standardized screens are appropriate to accomplish a pre-defined process. Any number of computer processes may be developed and deployed using the standard interfaces. The computer process automatically takes a user from screen to screen, prompting the user to review or provide information or take appropriate action. Processes may be represented using metadata. Metadata may provide data to a screen rendering process running on a user's workstation with details on how to render one of a plurality of standard screens in a manner which is specific to a particular process. Metadata may be provided to define the steps of the process for enabling navigational capabilities. Metadata may stored in a database and communicated by a process server to a client computer, which acts as a user's workstation. This client-server system architecture allows maintenance of the computer processes in a central location and remote management of their use within a network. Furthermore, any number of application-specific computer processes may be made available and distributed to users without detailed programs for those processes having to be stored at each user workstation. Furthermore, basic interface functions with legacy databases and back-end systems may be provided to each user workstation in a network through the server system.

38 Claims, 18 Drawing Sheets

FIG. 4

DYNAMIC PROCESS-BASED ENTERPRISE COMPUTING SYSTEM AND METHOD

PRIORITY INFORMATION

Benefit of priority is claimed under 35 U.S.C. 119(e, ) of U.S. provisional application No. 60/060,512 filed Sep. 30, 1997.

FIELD OF THE INVENTION

The present invention relates to the field of enterprise work flow management tools, and more particularly, to computer tools for designing and implementing integrated enterprise processes on computer systems using standardized screens.

DESCRIPTION OF THE RELATED ART

Using enterprise software to accomplish a business process can be an extremely complicated undertaking today, given the plethora of different systems and complex interfaces that people must manipulate. The tremendous information technology advancements that have occurred over the past twenty-five years have changed virtually every aspect of business. Enormous business value has been generated by the investments that companies have made in enterprise resource planning (ERP) systems, databases, desktop applications, best-of-breed solutions, legacy systems, and other technologies. Unfortunately, most firms are unable to realize the full benefits of these investments because the usability of their systems has lagged behind the improvements in hardware, infrastructure, and applications. Consequently, it is crucial that these companies find ways to make their computer systems easier to use. The computer usability problem is being driven by several trends that are changing today's business environment. More and more business functions across the enterprise are beginning to employ computer applications. At the same time the number and types of software applications used to accomplish business processes are proliferating. Also, software has continued to increase in complexity and become rich with unnecessary, extraneous features. Moreover, due to diminishing computer hardware costs, software products have been able to avoid using computer resources efficiently. Compounding the problem, the integration of systems within an enterprise has caused those systems to become more complex.

It is common to find many, if not all, of these trends working together within an organization to drive up information system complexity. This interaction adversely affects usability at multiple levels within the enterprise, due to the simultaneous contributions of software applications, business processes and functions, and system integration. A key difficulty has been the way in which information systems have been defined as merely a group of applications that automate tasks to improve the efficiency and/or accuracy of specific work activities. This application-centric view of systems is commonly referred to as the application model. This model was a much better fit with the way that people used to work within companies, rather than the broader process orientation that many companies have today.

Application functionality is a key driver of competition in the software industry, and this has caused developers to focus on the race for additional features, at the expense of software usability. However, more powerful applications do not necessarily yield more productive workers. Today's application software provides a high degree of functionality, of which only a small fraction ever gets used. For any individual user most features will be useless. The more objects shown to a user, the longer it will take the user to find the ones they need. Even if it only takes the user half a second to check features they do not need, at the end of the year, many hours may have been wasted. Also, it may be difficult for many users in a business environment to map the correct application functions, in the correct order, to their business process objectives. Adding features that have less and less utility has made it more difficult for typical business users to find the correct features to achieve their objectives, because there is a larger set to choose from. The bottom line is that these extra features waste user time and system resources.

These usability problems are compounded when a business process requires users to use several different applications to accomplish their goal, a common situation in most organizations. In fact, it is estimated that approximately eighty percent of information workers have to learn and stay competent in at least six different software applications to do their job. Even companies that have invested heavily in ERP systems and enterprise application integration are finding this to be true, because they are unable run their entire business on just one information system.

Business users today must use very complex software applications, and plenty of them, to get their work done. The difficulty that people encounter when using enterprise software contributes to poor customer service and lost business opportunities. The costs and time required to train and provide technical support for information workers continue to rise. Even after people are trained, it is hard for companies to retain their intellectual capital due to turnover and undocumented "work around" processes. All of these issues prevent companies from realizing the intrinsic business value that currently exists within their corporate information systems.

The information technology (IT) departments of some enterprises may attempt to solve some of the above problems by creating custom enterprise software tools for specific business processes employed in their respective enterprises. However, development of custom software is an extremely arduous task that most IT departments lack the time and/or skill to accomplish. Fourth generation programming languages and graphical programming tools, such as Visual Basic or PowerBuilder, may assist in development time and ease, however, even with such modem development tools, development time and difficulty may be prohibitive. Such modem development tools provide component-based programming which allows the developer to simply select a component or object for displaying a data field or a dialog box. Modern development tools may provide many such components from which the developer must select the appropriate one. Once the developer has selected a component, the component must still be mapped to the data which it displays. For example, a component may be used to display a field of data from a database. In addition to specifying the database entry to which the component is mapped, the developer must also specify such parameters as the length and format of the display field, the location of the component on the display, etc. Component mapping typically requires a large portion of the development time.

Also, the process developer may want to have data validation functionality associated with each component to ensure that only proper data entries are received. For example, in a component for currency data or time data, it may be desirable to ensure that data entered is in the correct currency or time format. To accomplish this, the developer may have to code specific validation logic associated with each component. Validation coding may significantly add to the overall development time.

Furthermore, numerous components are typically involved for each user interface or display used to accomplish a task or process. The data mapping and validation described above may need to be repeated for each component. Thus, component data mapping and validation coding typically consume a large portion of development time. Also, as business tasks and processes become more complicated, more and more components may be added to a user interface to accomplish the tasks or processes. Not only does this complexity lengthen development time, but the usability of the user interface typically decreases with complexity. A display or user interface containing multiple components to perform various functions and tasks simultaneously may require a lengthy learning curve for a business user, such as a warehouse worker or sales person. Also, the complexity may lead to more mistakes in using the user interface.

Another problem faced by enterprise IT departments is that once enterprise software is developed to accomplish a business process, the executable code must be distributed to each user's computer. Not only is distribution of executables time consuming, but version problems may result. If an employee uses an old version, he may not perform his task correctly. Also, old versions may cause synchronization problems with other software such as a database which could result in crashes or data corruption. Some of these problems may be solved by performing distribution and version control over the company local area network (LAN), but if a user fails to leave his computer on and connected to the network, then the same problems may result.

FIG. 1 illustrates traditional application based computing employed by businesses today. A business user may need to accomplish a process 10, such as generating a quote. The user may employ a suite of different applications 30 to accomplish the process 10. For example, the process of generating a quote may include many activities 12–24 that are spread across several different applications 32–44. The user may first need to search private specifications from vendors whose products are resold, as indicated at 12. To accomplish this task the user may need to access one or more online vendor databases 32. Next, the user may need to check product availability, as indicated at 14. One or more inventory databases 34 may need to be accessed to check product availability. Next, a weekly price sheet may need to be checked for price reductions and to compare the product margins, as indicated at 16, by accessing an intranet HTML page 36. The user may then need to reference assembly schedules to ensure that resources are available to meet the ship date, as indicated at 18, by accessing a material production system 40. The user may then generate and modify an initial quote, as indicated at 20, by using a spreadsheet application 38 that retrieves parts and prices from the inventory database 34. The quote and related documents may then be assembled, as indicated at 22, by using a word processor application 42. Finally, the quote may be added to a quote database, as indicated at 24, by using quote data base application 44. The quote may also be sent to a customer by using an email or fax application (not shown).

This approach requires much time and attention from the user (e.g., salesperson), and also requires a considerable amount of time learning the unique activities, applications, and systems involved in the process. Time spent in learning to perform all of the disparate activities in the process and learning all the different applications, as well as time spent in unnecessary data conversion or other low-level tasks is not the most productive use of a salesperson's time. In addition, changes to any of the associated applications will require retraining of the sales force, and may necessitate modifications in the quote generation process. If customized development is required, development effort may be needed for multiple different applications to perform the process. The total required development time may be prohibitive so that the business may be forced to use less efficient off-the-shelf solutions.

SUMMARY

Methods and apparatus are described that more easily allow development and implementation and maintenance of processes, particularly processes for carrying out business oriented activities or processes. Embodiments may allow small businesses to develop such applications quicker, with less expense and skill. Embodiments may also enable large enterprises to more easily integrate enterprise-wide data into a centrally maintainable system, using application-specific computer processes, without imposing significant user training requirements.

According to the invention, computer processes for carrying out any of a predefined class of activities, for example business processes, are defined as a series of steps using a plurality of predefined, standardized user-interface screens. These standardized interface screens are linked together in predetermined orders to, in effect, implement on the computer any activity within the class or classes for which the standardized screens are appropriate. Any number of computer processes can, therefore, be easily developed and deployed using interfaces familiar to a user. The computer process automatically takes a user from screen-to-screen, prompting the user to review information, provide information or take appropriate action. Computer processes specific to a particular activity may be easily developed, deployed and modified using these predefined, standardized screens or user-interfaces. Thus, development and maintenance of an application-specific process may be shorter and less expensive, and it may require less programming skill. Furthermore, the need for training users on new application processes may be reduced, or possibly not even necessary. Users may develop custom user-interface screen types, or customize the generic screen interfaces, which may be reused in any number of processes.

According to one aspect of the invention, application-specific computer processes are represented using metadata, which may comprise tagged data. In particular, "presentation" metadata provides data to a screen rendering process running on a user's workstation with details on how to render one of a plurality of predefined, generic screens in a manner which is specific to a particular process. For example, the metadata might include names to go into headings of columns of information being displayed, in which case the metadata would be a tag identifying that the data associated with the tag is for the headings. The information below the headings would be supplied through a database query, which would be provided in, for example SQL, with a tag indicating that it is a query.

According to another aspect, "process" metadata may be provided to define the steps of the process for enabling navigational capabilities.

According to a further aspect, metadata may be stored in a database and communicated by a process server to a client computer, which acts as a user's workstation. This client-server system architecture allows maintenance of the computer processes in a central location and thus, in effect, remote management of their use within a network, such as a network in a large business enterprises. Furthermore, any number of application-specific computer processes may be made available and distributed to users without detailed programs for those processes having to be stored at each user workstation. Furthermore, basic interface functions with legacy databases and back-end systems may be provided to each user workstation in a large network through the server or servers. The server(s) also may access centralized databases.

According to another aspect, standardized screens used to make up an application-specific computer process are rendered within a standard, simple screen frame, which provides basic information and controls for navigating between the screens. According to a further aspect, processes may be launched from a "to do" list, listing specific tasks which have been assigned to a user. Selecting a task launches a process comprising a sequence of user-interface screens with appropriate data for carrying out that task.

One embodiment involves a method for process-based computing. The method may include transmitting a request for a step of a predefined process. The request may be transmitted from a client computer to a server computer. Accessing of a process database to retrieve process data for the request may be performed by the server computer. The process data may then be transmitted from the server computer to the client computer. The client computer may render one or more screens on a display as indicated by the process data for accomplishing the step.

This method may also include the server computer accessing data from an application or data store in response to the request for a step from the client computer. The server computer may transmit this data to the client computer and the client computer may render this data in the one or more screens as indicated by the process data. The application or data store may be accessed by the server computer over a network. The server computer may call a business object for accessing the data from the application or data store. The business object provides functionality to interface the server computer to the application or data store. Business objects may be stored in a business object repository which may be included within the process database. The business objects may be reusable objects so that the same business object may be used to interface data for different steps of the predefined process to the same application or data store.

The process database may be accessed by the server computer over a network. All of the steps of the predefined process may be defined by process data stored within the process database as metadata. The process database may be an open database conductivity (ODBC) compliant relational database. The process data stored within the process database may be formatted in an extensible markup language (XML). The process data transmitted from the server computer to the client computer may comprise XML formatted data. The process data may be transmitted from the server computer to the client computer over an intranet or over the Internet.

Rendering the one or more screens for a step of the predefined process may include displaying the one or more screens as indicated by the process data within a common navigational framework. User input may be received on the client computer to complete a step. The client computer may request a next step from the server computer. This may be repeated to complete the predefined process. The process data may be supplied by the server computer one step at a time so that process data for a next step is not provided until a current step is completed on the client computer. A predefined process may be initially launched from the client computer. Upon launching a predefined process, the first step of the predefined process is requested and received from the server computer.

Navigational control data may be transmitted from the client computer to the server computer. The navigational control data may include requesting a next step of the predefined process from the server computer or requesting a previous step of the predefined process from the server computer. The navigational control data may also include data for assigning the predefined process to a different user. Control data also may include data for pausing or canceling the current step of the predefined process.

Rendering screens by the client computer as indicated by process data received from the server computer, may include displaying a target screen for manipulating a remote data store. A list screen for manipulating rows of data in a remote data store may also be displayed. Process data transmitted by the server computer to the client computer may also indicate for the client computer to display a tree screen for presenting hierarchically related data. The process data may also indicate for a spreadsheet screen to be displayed for populating or manipulating data in a spreadsheet format. The server computer may interface the spreadsheet screen on the client computer to a spreadsheet application. Similarly, a document screen may be displayed for populating or editing formatted documents, and the server computer may interface the document screen on the client computer to a document application. The client may also be instructed to display a browser screen for viewing and navigating among information resources, or a report screen for viewing an information resource. A calendar screen may also be displayed, as indicated by the process data, for manipulating data from a remote data store in a calendar format. Also, a launch pad screen may be displayed by the client computer, as indicated by process data. The launch screen may list predefined processes available to be launched from the client computer. Instructions for each of the screens may also be displayed within a framework by the client computer on how to complete each step of the predefined process associated with the screens.

The client-computer may transmit requests for steps of the predefined process to the server computer using a protocol including hypertext transport protocol (HTTP). The requests may be transmitted over an intranet or over the Internet.

The predefined process may be defined as a series of steps to accomplish an objective. Process data representing the series of steps may be stored in the process database. Defining a process may include indicating one or more standard screens to be used for each of a series of steps. The standard screens may be selected from a limited number of standard screens. A purpose may also be specified for each of the screens. A business object may also be specified for each screen. The business object may specify data to be displayed by the screen. The business object may also provide an interface to a remote data store or application. The series of screens with specified purposes and business objects may be defined in metadata, which may be formatted in XML. Storing process data representing the series of steps may include transmitting the metadata to the server computer. The server computer may insert the metadata in the process database.

A client application may be downloaded from the server computer to the client computer. Requests for steps of a predefined process and rendering of the screens to accomplish the steps, as indicated by process data received from the server computer, are performed by the client application on the client computer. The client application may include platform independent code running on a virtual machine on said client computer. The virtual machine may be within a web browser on the client computer.

A computer system may include at least on CPU and a storage medium accessible by the CPU. The storage medium may include program instructions operable to implement a client interface. The client interface may be configured to receive process data indicating a first screen to be used for accomplishing a first step of a predefined process. The client interface may also be configured to render the first screen within a navigational framework on a user display. Following user input to the navigational framework, the client interface may receive process data indicating a next screen to be used for accomplishing another step of the predefined process. The client interface may render the next screen within the navigational framework on the user display. The client interface may continue to receive process data and render the screen accordingly to complete the predefined process. The computer system may also include a communication link coupled to the CPU. The client interface may be configured to receive the process data from a process server across the communication link. Screens rendered by the client interface, and the fuctionality of those screens, may be determined by the process data received by the client interface. The process data may be stored in a process database remote from the computer system on which the client interface is implemented. Program instructions operable to implement the client interface may be downloaded to the storage medium from the process server.

Screens rendered by the client interface to accomplish the steps of the predefined process are selected from a limited number of standard screens that are specified by the process data. The process server may provide an interface between the standard screens and back-end stores or applications. The back-end data stores or applications may be remote to the client interface and/or process server.

Each standard screen may be rendered by the client interface within a common navigational framework. The navigational framework may include one or more graphical controls for a user to control the flow of the predefined process. A next control may be included to advance to a next step of the predefined process. A previous control may be included to return to a previous step. An assign control may be included to assign the predefined process at its current stage to another user. A pause control may be included to stop the predefined process and save it at its current step. A cancel control may be included to stop the predefined process without saving it at its current step. The navigational framework may include an instruction component for displaying instructions on completing the current step of the predefined process. The client interface may be configured to send results of a completed step to the process server across the communication link. The client interface may communicate with the process server using HTTP or a security enhanced HTTP such as HTTPS. The client interface may include Java instructions and may run on a Java virtual machine within a web browser.

BRIEF DESCRIPTION OF THE DRAWINGS

A better understanding of the present invention can be obtained when the following detailed description of the preferred embodiment is considered in conjunction with the following drawings, in which:

FIG. 4 illustrates an example of another embodiment of a screen framework that may be rendered by a universal client;

Figure 1:
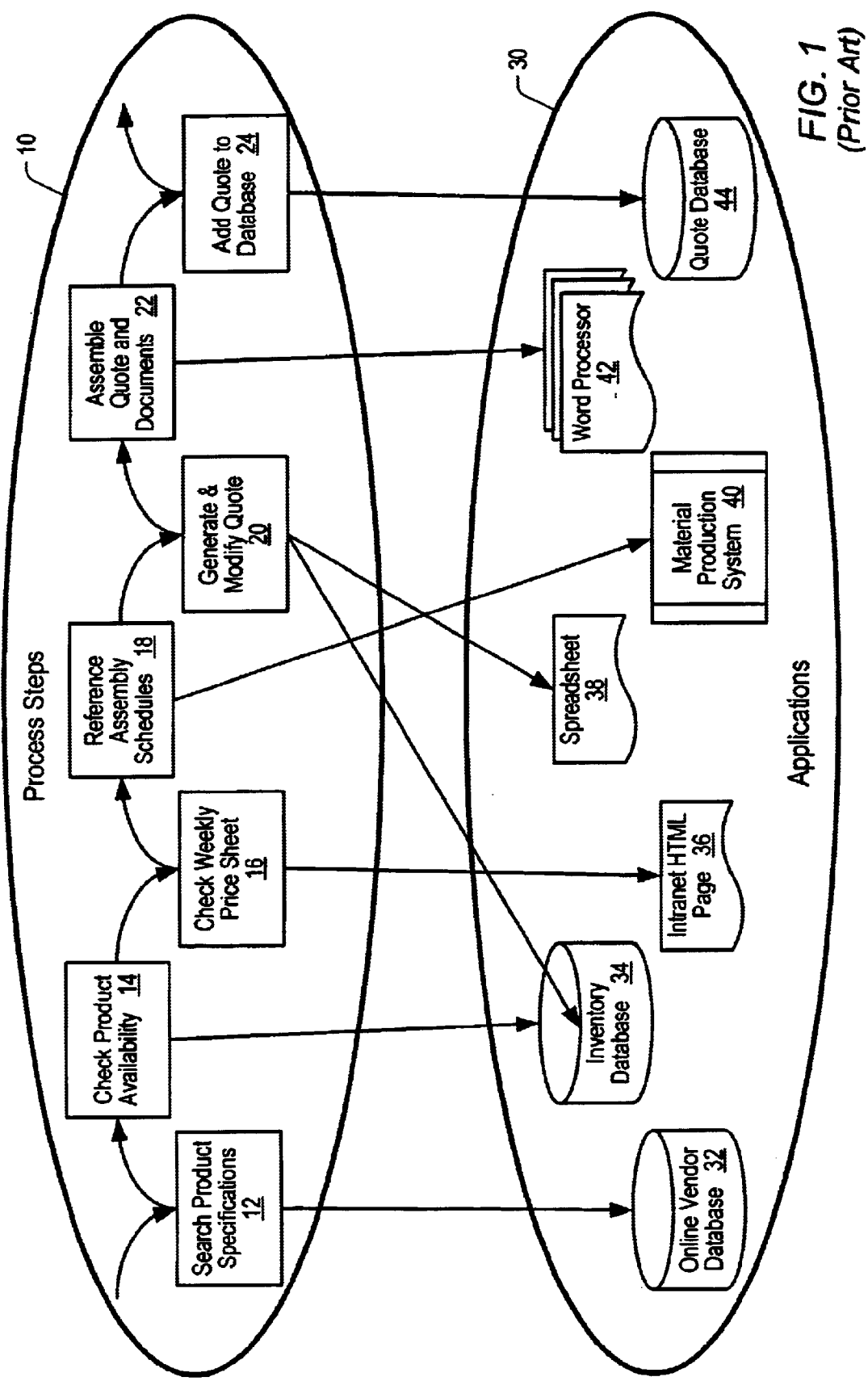
FIG. 1 illustrates traditional application-based computing employed by businesses today.

While the invention is susceptible to various modifications and alternative forms specific embodiments are shown by way of example in the drawings and will herein be described in detail. It should be understood however, that drawings and detailed descriptions thereto are not intended to limit the invention to the particular form disclosed. But on the contrary the invention is to cover all modifications, equivalents and alternatives following within the spirit and scope of the present invention as defined by the appended claims.

DETAILED DESCRIPTION

Figure 2:
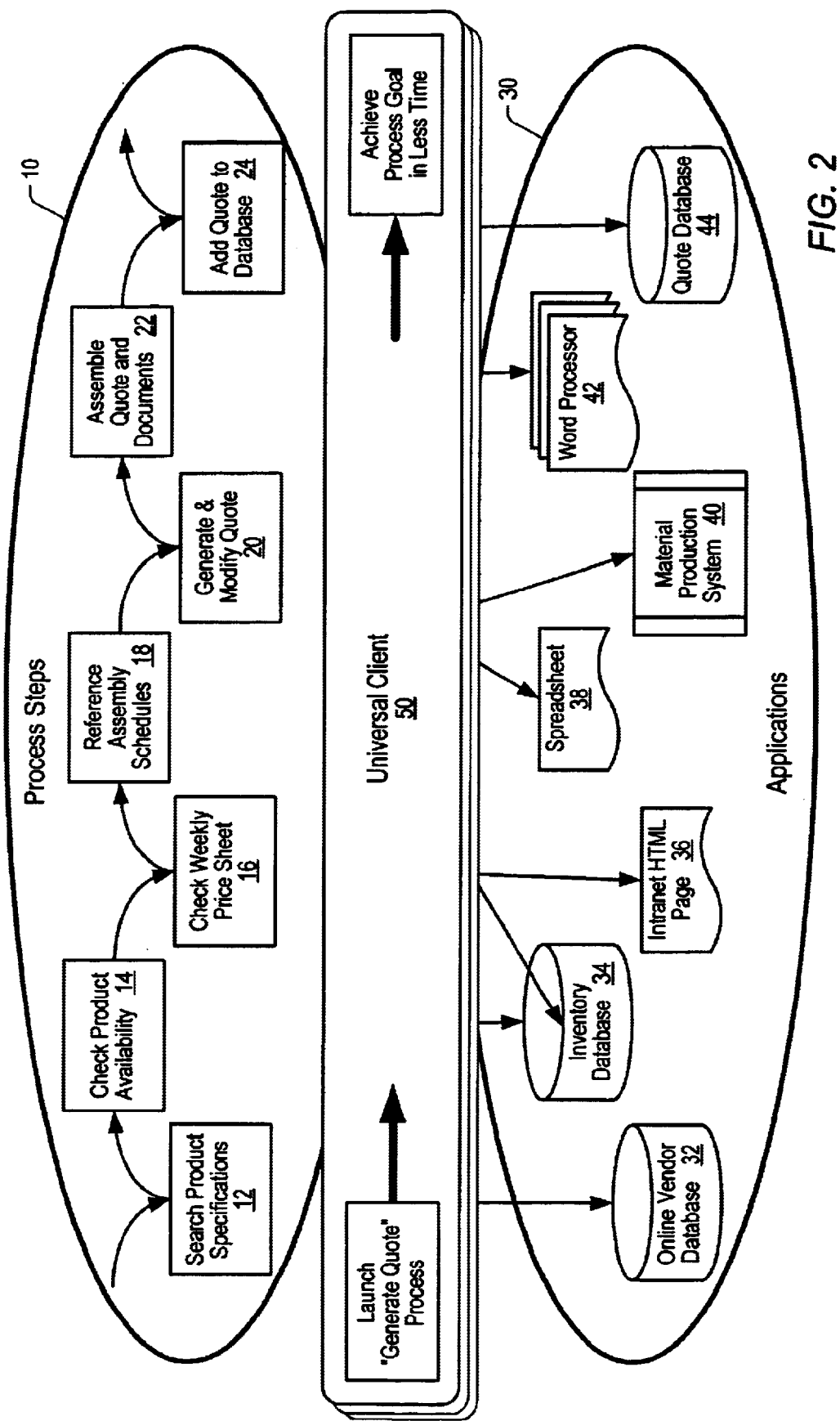
FIG. 2 illustrates process-based computing using a universal client to lead a user through a business process.

Turning to the drawings, FIG. 2 illustrates how the same process 10 illustrated in FIG. 1 may be accomplished using a universal client 50. The universal client 50 may introduce a single process thread between the process steps 12–24 and the various applications 32–44 used to do the work. When using the universal client 50, the user does not have to be familiar with the applications, databases, or infrastructure that are involved in the various process steps. For example, the universal client 50 may lead a salesperson through all of the process activities to generate a quote, meaning that the salesperson only needs to know how to launch the "Generate Quote" process. Once initiated, the universal client 50 will guide the user through a series of steps to accomplish the desired process. The steps or tasks may be presented by the universal client 50 using a limited number of standardized screens in a common navigational framework. Once a user has learned the set of screens and navigational framework, the user may accomplish any process with almost no additional training.

The universal client may provide a single business process interface for ERP systems, database applications, best-of-breed solutions, desktop applications, legacy systems, and even existing enterprise application integration solutions. The universal client serves as a common user interface for all of these disparate systems and liberates the user from having to deal with multiple complex interfaces and confusing process flows. The standardized screens and navigational framework of the universal client allows users to experience the same look and feel throughout all of their business processes, regardless of which applications the process steps may involve. The universal client provides a process framework that essentially "holds the user's hand" as he carries out his business process. The universal client also logically separates the backend systems from the user interface, so that the impact on end users is minimized should a company need to make changes or additions to the underlying systems.

The set of standard screens employed through the universal client may be used as building blocks to construct any business process. A single interface for all applications may be built with common screens that encapsulate universal patterns that may be found in all business processes.

The standard screens may be linked together in a business process through the universal client to accomplish a business goal or objective. Using the universal client, a user may simply identify a goal, and then the system guides the user through the related activities until the goal is accomplished. The universal client may differ from traditional application-based interfaces at the level in which users interact with the system. The universal client allows users to control the computer at a process level rather than at the lower application or activity level. Many of the extraneous activities normally required of the user are made transparent, thereby making the process easier and faster to complete. A process may be implemented so that the universal client feeds process tasks to the user one at a time, so that the user can concentrate on each task individually without being distracted or confused.

The universal client includes program instructions that may be stored on a computer-readable medium and when executed present a standard user interface within which predefined business processes may be executed. The universal client is configured to render one or more of the standard screens as defined by a process received from a server. In a preferred embodiment, the universal client may be implemented as a Java applet that is accessed through a standard Java-enabled internet browser, such as Netscape Navigator or Microsoft Internet Explorer. In other embodiments, the universal client may be a stand alone application or may run under a Java virtual machine and include its own communication interface. While the universal client is implemented in Java in a preferred embodiment, other embodiments may be implemented in other development languages. The universal client may also include dynamic linked libraries (DLLs) that provide the Object Linking and Embedding (OLE) interface to desktop applications such as Microsoft Office applications.

As noted above, the universal client may present a standardized user interface through which processes may be executed. This interface may include a screen or series of screens chosen from a limited set of standardized screens and presented to the user in the correct order to accomplish the process. Each screen may have a header that presents a goal graphic and name, a step name, and a progress indicator. Each screen may include a footer that may provide a step/process instruction bar, a text help area, and standardized navigation buttons. The header and footer may provide a standard process navigation framework that allows the user to control process navigation. The standard navigation buttons that may be integrated into the footer of each screen allow the user to navigate forward or backward within the process. For example, Next and Back (Previous) buttons may provide functionality similar to that offered by a web browser. In addition, navigation menus may allow the user to jump to optional, previous, or subsequent steps in the process.

Figure 3:
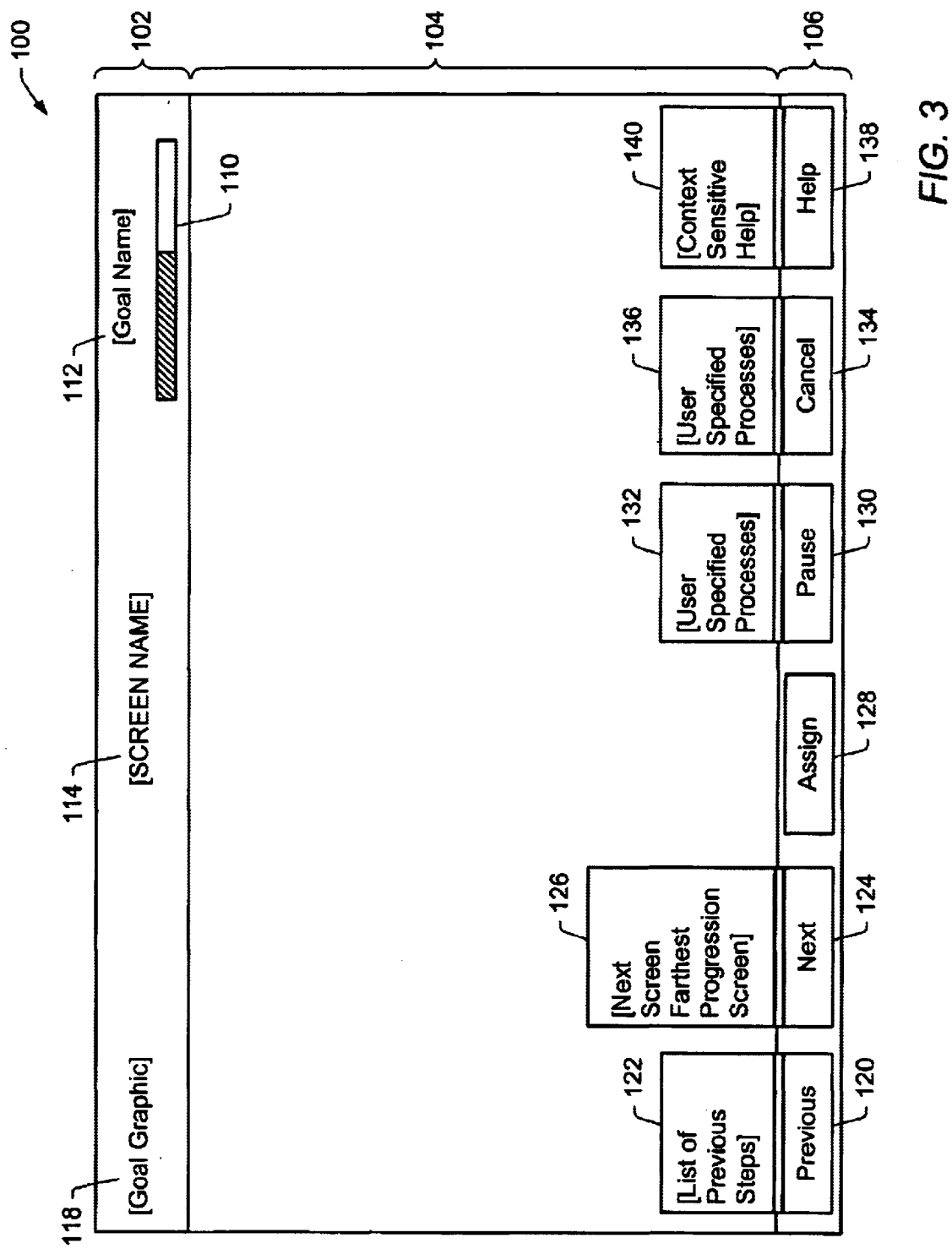
FIG. 3 illustrates an example of one embodiment of a screen framework that may be rendered by a universal client.

Turning now to FIG. 3, an example of one embodiment of a screen framework 100 that may be presented by the universal client is illustrated. Screen framework 100 may be a basic shell for all screens and processes. As the user works through a process or selects other processes, the shell may remain the same as its content in area 104 changes between the pre-defined screens. Progress indicator 110 provides the ability to present user progression through a process. Also, the name of the current process 112, the present step name 114 as well as a graphic assigned to the process 118 may all be presented within header 102. The graphic provides visual recognition to a business process.

As previously mentioned, the framework 100 has associated a limited number of buttons for moving through the process steps. The "previous" button 120 provides the ability to move backwards in a process. When the mouse moves over previous button a pop-up menu 122 may display, e.g., in order the last 10 steps that have been performed in this process. If more than 10 steps have been performed, a "More . . ." selection is added which brings up a list of all previous steps. If the user clicks on the previous button, the shell displays the screen one step back. If the user selects one of the screens in the pop-up menu, the shell displays that specific screen. Each of the previous screens may be displayed exactly as it appeared the last time it was displayed. The current screen may not be validated when moving to a previous screen. The above description is merely an example of the functionality that may be provided with a previous button 120.

The "next" button 124 may provide the ability to progress forwards in a process. When the mouse moves over the next button, a pop-up menu 126 may display the next screen as defined in the process, the farthest progression screen and all of the optional processes associated with that screen. The farthest progression screen refers to the farthest point to which the process had progressed prior to moving to a previous screen. If the user clicks on the next button, the shell displays the next forward screen. If the user selects the farthest progression screen, the shell displays that specific screen. The farthest progression screen may be displayed exactly as it appeared the last time it was displayed. If the user clicks on an optional process, the shell displays the first screen in that process. Sub-processes can be nested infinitely and, as each sub-process completes, the shell returns to the next screen in the super-process from which the sub-process was initiated. The current screen may be validated when moving to the next screen. The above description is merely an example of the functionality that may be provided with a next button 124.

The "assign" button 128 may provide the ability to assign the current process to another person user by name or by role. The assignee may pick up the process from their own do list screen or launch screen in the same state as when it was transferred. The current screen may not validated when assigning a process to another user.

The "pause" button 130 may provide the ability to stop the current process and save it in a to do list to be completed at another time. When the mouse moves over the pause button, a pop-up menu 132 may display, e.g., a list of up to 10 user-specified processes. If more than 10 processes have been specified, a "More . . . " selection is added which brings up a list of all specified processes. If the user clicks on the pause button, the shell displays the to do list. If the user selects one of the user-specified processes, the shell immediately begins the selected process. The current screen may not be validated when pausing a process.

The "cancel" button 134 may provide the ability to stop the current process and discard all work. When the mouse moves over the cancel button, a pop-up menu 136 displays, e.g., a list of up to 10 user-specified processes. If more than 10 processes have been specified, a "More . . . " selection is added which brings up a list of the specified processes. If the user-specified clicks on the cancel button, the shell displays the to do list. If the user selects on of the user-specified processes, the shell immediately begins the selected process. The current screen may not be validated when canceling a process.

Help window 140 may provide the ability to display pre-defined help and provide context-sensitive help when the user presses F1 (i.e. help) or moves the cursor over or clicks help button 138.

Figure 4:
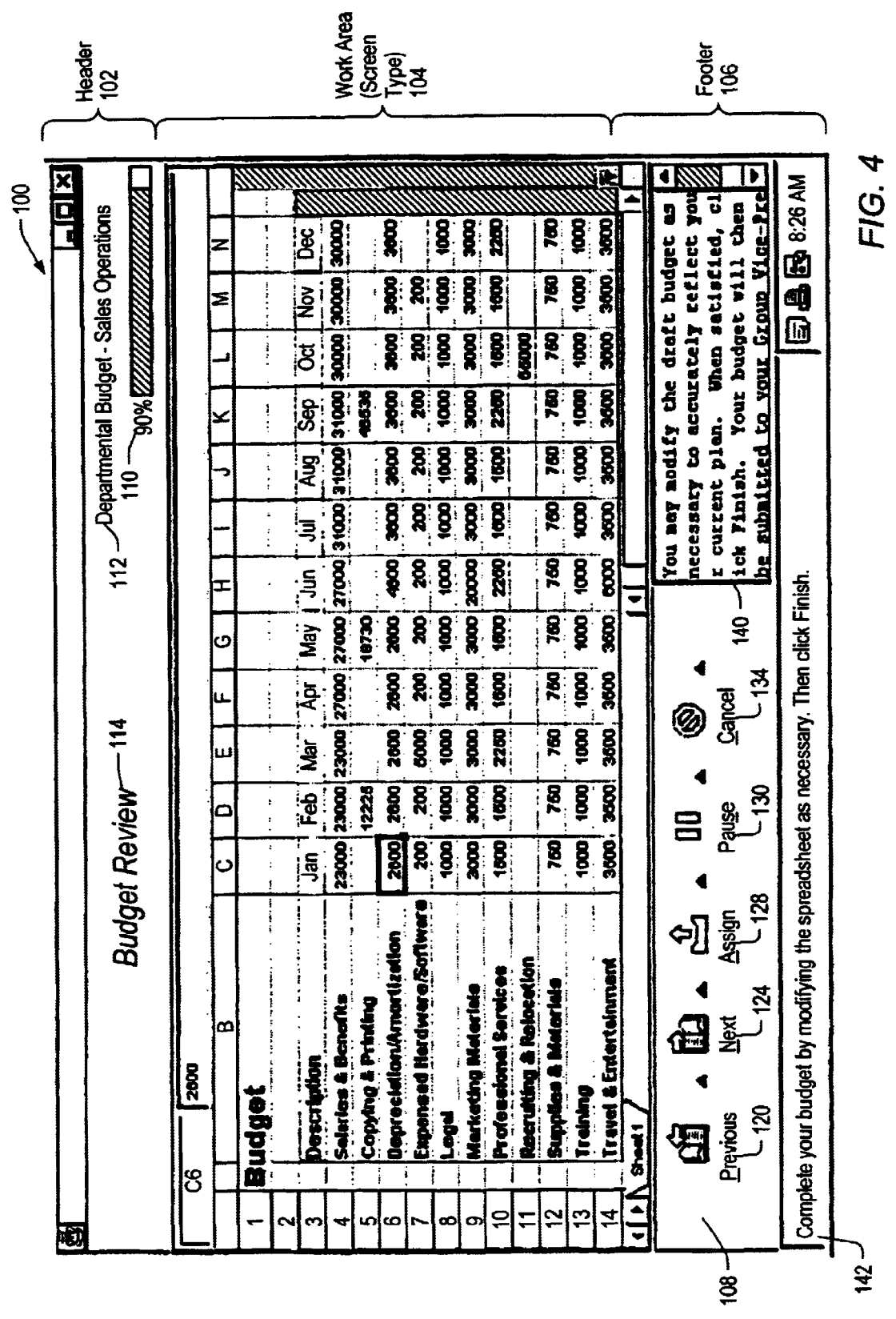

FIG. 4 illustrates another example, according to another embodiment, of a screen framework 100 that may be presented by the universal client. Framework 100 may include a header 102 which may include similar elements as header 102 in FIG. 3, such as a progress indicator 110, the name of the current process 112, and the name of the present task or step 114. The framework 100 of FIG. 4 also may include a footer 106. Footer 106 may include navigational buttons 108, such as previous button 120, next button 124, assign button 128, pause button 130, and cancel button 134. A help window 140 may also be included within footer 106. An instruction window 142 may also be included within footer 106. Instruction widow 142 may contain instructions on completing the current process step.

The framework 100, including header 102 and footer 106, may contain essentially the same components for all of the screens comprising a defined process. However, work area 104 may change for each step of the process as defined by the process developer. Work area 104 is chosen to allow a specific step of the process to be accomplished by the user. The different work areas which may be selected are defined according to a limited set of standard screen types defined below.

Figure 5:
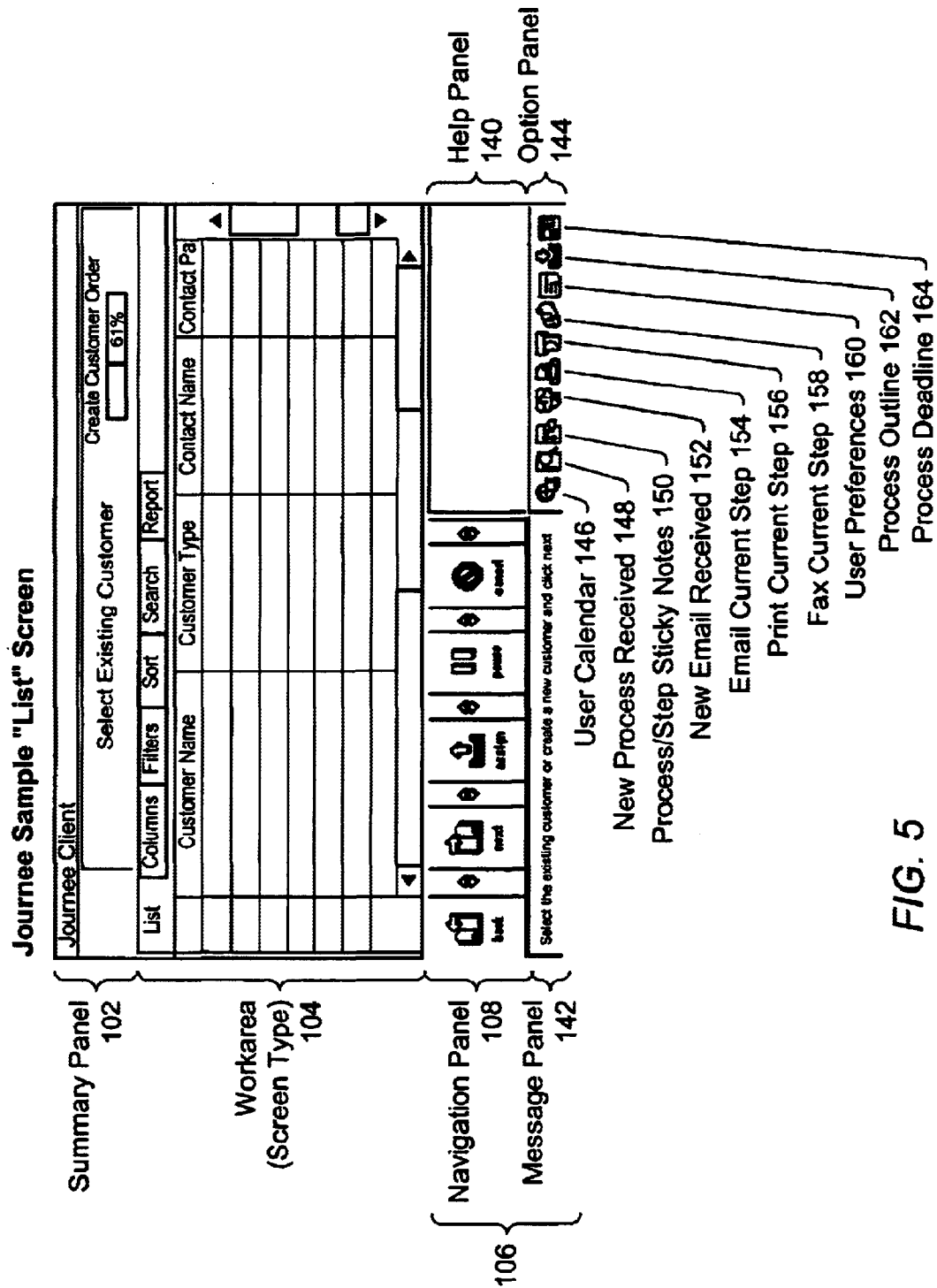
FIG. 5 illustrates an example of another embodiment of a screen framework that may be rendered by a universal client.

Turning now to FIG. 5, another embodiment of screen framework 100 that may be presented by the universal client is illustrated. The embodiment illustrated in FIG. 5 includes a summary panel or header 102, work area 104, and footer 106 similar to the corresponding elements of FIGS. 3 and 4. Note that help panel 140 in FIGS. 4 and 5 may be a scrollable window as opposed to the button of FIG. 3. The help window 140 may be visible at all times. As the user moves from component to component in any of the standard screens, the text visible in the help window may automatically adjust to match the component with "focus" (where the cursor is). In an embodiment, all of the help text required for any given screen in a process is available to be scrolled through, however, because of the small size of the help window, only the active component help may be visible at any given point in time.

The framework illustrated in FIG. 5 also includes option panel 144 within the footer. Option panel 144 may be used to place dynamic options that may need to be available to the user at any point in a process. These option controls may include a user calendar 146 that launches a calendar screen that allows the end user to indicate to the system when he/she will not be available to receive assigned processes. If an end user is assigned a process during a time when they are unavailable, the assigning user receives an associated message and is given the option to assign it to someone else or wait until the intended recipient returns. A new process received option control 148 may appears in the option panel 144 when a new process has been assigned to the end user. Process/step sticky notes option control 150 may launch a target screen (see below for definition of target screen) that allows the end user to browse and manipulate the process and step level notes that have been added to the current process or step. A process level note is a note that applies to the entire process and is visible on any step within that process. A step level note is a note that applies only to a particular step and is only visible on that step.

A new email received control 152 may appear in the option panel 144 when a new email has been received by an end user. Email current step control 154 may format an email "report" of the current screen and launch a target screen to specify the recipient. A print current step control 156 may format a "report" of the current screen and pass the report to a default printer. Fax current step control 158 may format a fax "report" of the current screen and launch a target screen to specify the recipient fax number. A user preferences control 160 may launch a small series of target screens that allow an end user to specify various user preferences (i.e. preferred language, colors, etc.). A process outline control 162 may launch a tree screen (see definition below) that displays the current process in a text hierarchy. This view shows each step as a branch of the hierarchy and gives the user a different perspective of the process (whole process vs. one step at a time). In one embodiment, the end user may "jump" around in a process through the process outline. A process/step deadline control 164 may Launch a target screen to specify a deadline for either the current process or step.

As mentioned above, the universal client may present a common framework to the user, such as header 102 and footer 106 in FIG. 3, 4 or 5. However, the work area 104 within the common framework may change for each step of a defined process. To accomplish a task or step in a process, the universal client may present within work area 104 one or more standard screens selected from a limited number of standard screen types. A process may be referred to as series of sequential tasks (i.e. steps) performed by one or more users to accomplish a given business goal. A step may be referred to as a logical task in a business process. To accomplish a step, the universal client may present a screen or combination of screens, e.g., within the work area 104 of the common framework 100, to a user. A step may refer to a "stopping point" in a business process whereby the user must complete some specified work and continue in the process when done. This specified work may be spread across one or more screens contained in the "workarea".

The universal client may present a screen as a basic building block of a step. Typically there will be only one screen per step, however, a step may be defined to use multiple screens. In a preferred embodiment, each screen is minimally identified by a type (see base screen types below), a purpose and an associated business object. The purpose determines the type of behavior expected from the rendered screen. For example, a target screen (see description below) may be used to manipulate single "rows" of data in a back end data store or database. The purpose identifies to the screen the standard behavior to invoke. Example purpose options may be: 1) VIEW, 2) CREATE, 3) UPDATE and 4) DELETE. Each screen is also assigned a business object. A business object is simply an object that has methods (i.e. functions) and attributes (i.e. data elements) and is used specifically as the "go between" to external systems. These systems might provide a standardized interface or one may need to be created, but the common link to them is through a business object. Business objects may be created on an application specific basis or standard business objects may be used. Business objects may utilize the open Common Object Request Broker Architecture (CORBA) standard. In summary, a screen may be the basic unit of getting work done in a process and may only require 1) specification of screen type, 2) definition of its purpose and 3) assignment of a business object.

The following is a description a various screen types that may be used to implement the steps of a business process according to one embodiment.

Target Screen—A "target" screen may be one of the types of screens designated to implement a process. A "target" screen may provide the ability to maintain individual records in a database. Each field may be dynamically displayed based on its type within a back-end database. For example, if the field is defined as a character field, then a text control is placed on the screen to contain the value. The target screen may be used for performing database manipulation (usually an individual row in a table of a relational database). The target screen is flexible to allow all types of database manipulation. This includes the traditional structured query language (SQL) Insert, Update and Delete statements as well as application program interface (API) calls to satisfy non-relational database schemas, business objects and other external functions. The target screen may allow users to maintain data from disparate systems all on the same screen. Purposes which may be set for the target screen include: 1) View, 2) Create, 3) Update, 4) Delete.

List Screen—A "list" screen may be one of the types of screens that may be rendered on the universal client. It may be used for presenting and allowing the selection of one or more logical rows of data from a back-end data store or database. The data may be presented in a grid control with each data element representing a column in the grid. The columns are formatted based on the type of data being presented in the column. For example, a currency element would be presented in a currency format and right justified while a text element would be left justified. In addition to simply displaying the rows of data, the List Screen may also allow the end-user to manipulate the back-end data store at the row level. For example, a multi-selection List Screen may be capable of allowing the end user to select all of the rows to be deleted and click the Delete key. After verification of the user's intent, the keys to the selected rows are returned to a server to be deleted. The List Screen may be manipulated by the end-user in real time. Work area 104 in FIG. 5 illustrates a List Screen. Each of the tabs shown provide the end-user with a different formatting capability. Purposes that may be selected for the list screen are: 1)View, 2) Maintenance, 3) Create, 4) Update, 5) Delete, 6) Select. Thus, the list screen may provide the ability to list and select from multiple rows of data. The user may control filter conditions, column visibility and sort order. The user may dynamically create a report based on the list screen contents and select one or more rows (if necessary).

Tree Screen—A "tree" screen may be one of the types of screens that may be rendered on the universal client. The tree screen may be used for presenting and allowing the selection of hierarchically related data. It may be capable of displaying an image on each row with an open and closed state. It also may be capable of displaying multiple columns of data, however, the display differs from a standard grid or the list screen. While lists provide uniform columns which are equivalent for each row, the tree screen may display columns as a single line of text with a comma acting as the column delimiter. Thus, the tree screen may provide the ability to hierarchically list and select from multiple rows of data. This screen may be similar to the list screen with the added capability of nesting records within other records. This type of tree list may allow the user to expand and contract records within the list. The purpose parameter of the tree screen determines how the data is expected to be treated by the end user. Purposes for the tree screen may be: 1)View, 2) Retrieve.

Spreadsheet Screen—The spreadsheet screen may be one of the base screen types that is rendered by the universal client. The spreadsheet screen may provide the ability to view, edit, or maintain formatted spreadsheets. It may be used for collecting or presenting data that can most appropriately be represented by a tabular (rows and columns) interface. A typical spreadsheet screen use-case follows: A process designer determines that the data that the current step in the process being designed needs to acquire will be best represented by a spreadsheet style interface. The designer will create a template spreadsheet document that defines the formatting, headings, row and column names, and other visual details of the screen that will be presented to the user. The designer will then indicate which cells or ranges of cells within the template document will be interpreted at the completion of the process step for the values that the eventual user of the process entered or changed. These cells and ranges are indicated by providing unique names corresponding to each cell's or range's desired data. This template document is then saved and packaged as part of the particular step being designed for the process. When the process is executed, the user that executes the step that was implemented as a spreadsheet screen will see the template document loaded into a bean (e.g. JavaBean) or application that provides the spreadsheet screen interface. The user will be instructed to enter the value or values in the indicated cells or ranges in the spreadsheet screen. When the user has completed the data entry, the step can be completed by using one of the screen's navigational buttons. At this point, the values that the user provided may be forwarded to a server. The modified spreadsheet document itself will be preserved (saved) in case it needs to be re-presented in a later step. A server may be made aware of the storage location of the saved modified document or have the spreadsheet binary file forwarded to it. The implementation of the spreadsheet screen is not specific to a certain spreadsheet application; that is, it should not be assumed that the spreadsheet screen will be (or look like or operate like) Microsoft Excel for example.

This doesn't mean that Microsoft Excel cannot in fact be the application that implements the required spreadsheet screen behavior and interface, but that the process developer does not need to make the assumption that this is and will always be the case. The universal client framework will render the behavior and operation of the spreadsheet screen, and the implementation may or may not be an application such as Microsoft Excel. Purposes for the spreadsheet screen may be: 1)View, 2) Maintenance.

Document Screen—A document screen may be one of the base screen types that is rendered in the frame work area (on the client). A document screen may provide the ability to view, edit or maintain formatted documents. It may be used for collecting or presenting data that can most appropriately be represented by a textual document interface. A typical document screen use-case follows: A process designer determines that the data that the current step in the process being designed needs to acquire will be best represented by a document style interface. The designer will create a template document that defines the initial text content, formatting, headings, empty fields, and other visual details of the screen that will be presented to the user. The designer will then indicate which text positions or ranges within the template document will be interpreted at the completion of the process step for the text that the eventual user of the process entered or changed. These positions and ranges are indicated by providing unique names corresponding to each position's or range's desired data. This template document is then saved and packaged as part of the particular step being designed for the process. When the process is executed, the user that executes the step that was implemented as a document screen will see the template document loaded into a bean or application that provides the document screen interface. The user will be instructed to enter the text at the indicated positions or ranges in the document screen. When the user has completed the text entry, the step can be completed by using one of the screen's navigational buttons. At this point, the text that the user provided may be forwarded to a server. The modified document itself may be preserved (saved) in case it needs to be re-presented in a later step. A server may be made aware of the storage location of the saved modified document or may have the document binary file forwarded to it. The implementation of the document screen is not be specific to a certain document application; that is, it should not be assumed that the document screen will be (or look like or operate like) Microsoft Word, for example. This doesn't mean that Microsoft Word cannot in fact be the application that implements the required document screen behavior and interface, but that the developer need not make the assumption that this is and will always be the case. The universal client framework will render the behavior and operation of the document screen, and the implementation may or may not be an application such as Microsoft Word. The current purposes supported by the document screen are: 1) View, 2) Maintenance.

Browser Screen—The "viewer" or "browser" screen may be one of the types of screens that can be rendered on the client. It may be used for presenting hypertext markup language (HTML) content retrieved from the Internet, intranet, extranet, or generated report. The viewer screen itself can perform the duties required by both the logical HTML Viewer screen as well as a Report screen. The primary difference between the two may be that the Report screen does not have a need for the user to provide a uniform resource locator (URL) while utilizing the screen. The HTML Viewer screen will optionally provide the URL entry field based on a process designer's specification. The Viewer screen may be used to push "controlled HTML content" to the user in a business process. Purposes for the browser screen may be: 1) View.

Report Screen—A report screen may be essentially the same screen as the viewer screen. Reports to be viewed on the universal client may be implemented by a called method in a business object which produces a temporary HTML file which is displayed in the browser screen. The report screen may be used to view reports stored in a report repository utilizing data contained in a legacy database(s). Purposes for the report screen may be: 1) View.

Calendar Screen—A calendar screen may be the same as a list screen except that the data is presented based on a selected date data element. The list screen places records one after the other in some pre-determined order while the calendar screen may lay out records in chronological order and place specified data elements into the day boxes in a calendar view. Purposes for the calendar screen are: 1)View, 2) Maintenance, 3) Create, 4) Update, 5) Delete, 6) Select.

As noted above, a process designer may select a purpose for each screen type in a defined process. The following are general descriptions for one embodiment of each purpose without regard to their specific differences on each screen type:
1) VIEW—no user manipulation is allowed, however all specified data is visible;
2) CREATE—inserts a "record" into a backend data store after field validation has occurred;
3) UPDATE—updates an existing "record" in a backend data store after field validation has occurred;
4) DELETE—removes an existing "record" in a backend data store;
5) MAINTENANCE—allows the user to select a "record" and the associated purpose (CREATE,UPDATE, DELETE) for that record [this is useful when the process designer does not know the intent of the end user];
6) SELECT—allows a user to select one or more "record(s)" in a backend data store.

Other screen types and purposes are also contemplated such as described in U.S. Provisional application serial No. 60/060,512, filed on Sep. 30, 1997 and titled "Method and Apparatus for Rapid Development of Computer Processes" which is hereby incorporated by reference in its entirety. It is believed however, that almost any business process may be implemented by selecting from a limited number of standard screen types such as described above.

By specifying one or more of the above screen types along with a purpose and a connection to a back-end data store, a process designer may provide the tools to implement almost any business process. The process designer selects the necessary screens and arranges them in the necessary order to accomplish a business process. A business worker who desires to perform the process, simply launches the process in the universal client. The universal client renders the screen(s) within the common frame work to perform each step of the process. The user uses the navigation controls of the common framework to move through the steps. The help and message windows in the framework guide the user through each step. Because of the common frame work and limited number of screen types, the user may perform almost any task without having to learn new applications.

The universal client may also perform input data validations. The universal client may validate many standard field types as a check before displaying the data or sending the information to the server. Examples of these field types are all ANSI standard SQL data types, as well as currencies and telephone numbers. If necessary, the universal client may also execute custom validation code at the beginning or end of a step, process, or when a component within a screen is entered or exited.

The universal client may also support a collaborative work environment. The universal client may strengthen collaboration among information workers by providing the tools to easily communicate with other users, roles, or work groups. At any stage in a process, users may assign process steps to another user or role simply by clicking on the Assign button at the bottom of the screen. Just like passing off printed work, universal client users may also attach messages (sort of a digital version of "sticky notes") to a process or process step and can designate the intended recipient(s) of those messages.

The universal client also allows a user to efficiently manage processes. A launch pad or "to do list" screen may be used to present a common screen where users can locate, start, or restart their processes. The launch pad screen may be a separate screen or may be implemented as one of the above screen types such as the tree screen. While working on a particular process, a user can click on the Pause button to quickly pause the current process and immediately start working on another process. When restarted, paused processes are in exactly the same state as when they were left. The launch pad may be thought of as a "to do list" screen and may provide the ability to begin business processes specific to a particular user. The to do list may be arranged hierarchically with branches (e.g. assigned, pending, historical and new processes). An assigned process is one that has either been assigned to the user by someone else or was paused by the current user. A pending process is one that was initiated by the current user, was assigned to someone else and is not yet complete. A historical process is one that was initiated by the current user and is now complete. A new process is one that has been defined but has not been initiated. These processes are arranged hierarchically by function (user-specific) to help in identification. A user can customize their to do list by specifying processes that are performed often in a personal quick list. These processes may be available in pause and cancel button pop-up menus.

The universal client also communicates with a server. The Universal Client receives step instructions and data from a process server, and then sends the step results back to the server. Interaction with the server is described in more detail below. In a preferred embodiment, all client/server communications are accomplished in a secure mode over HTTPS.

A process server may provide all services to the universal client. In a preferred embodiment, the components of the process server may be located on an NT server connected to the enterprise network over TCP/IP. In other embodiments, the process server may be implemented on other platforms, such as UNIX. In a large-scale implementation, this server may be balanced across multiple machines within a cluster on the network. The process server may have the following basic functions.

The process server may manage the runtime environment for all users. The process server may manage the current Launch Pad for each user that is logged onto the system. It also locates and loads each process that is requested by a universal client, and manages the execution of processes for all universal clients. The server runtime environment may make possible the execution of long-lived processes. When a user pauses the process that he is working on, the process server may maintain the current state of the process until the user is ready to restart.

The process server may also provide a scalable, fault-tolerant connection to all back-end systems. The process server may manage the connections to all of the enterprise's back-end applications and databases. The server may maintain connection pools to the back-end systems, and then manage the user log-ins and broker the universal client requests to these systems. In one embodiment, to achieve scalability and fault-tolerance for this connectivity, the process server may run within an application server such as the NetDynamics Application Server. The process server may realize the benefits of the NetDynamics application server by leveraging its open and scalable Platform Adaptor Components (PAC) architecture. The NetDynamics application server is merely illustrative of one type of application server that may be used.

The process server may also manage access to the process definitions. Processes may be defined using metadata. Once a new process has been created using a process designer tool, the process server may parse the metadata and store it in a relational database management system (RDBMS). This process database may exist on the same machine as the process server, but it may alternatively be stored on any database server to which the process server has access over an enterprise network. The process server may update the metadata in the database when an existing process is modified, manage multiple versions of a process that may be present in the database, and retrieve the necessary process metadata for each individual universal client at runtime. In a preferred embodiment, processes metadata is formatted in an extensible markup language (XML).

The process server may also simplify the distribution of processes. The process server may allow businesses to control process functionality by distributing the data that defines the process over the network, as needed. This distribution method may be simpler and more efficient than the traditional method of distributing executables.

The process server may also enforce system security. All data being sent across the network by the process server may be encrypted prior to transmission and all client/server communications between the server and the universal client is made via HTTPS. The server may use user/role security profiles stored in the process database to ensure proper access controls and to maintain the integrity of the data and system.

The process server may also manage a system process log. The process server may implement the system administration feature of maintenance of a system process log. The server may maintain records of user logon/logoff activities and may use these records to generate statistical reports. Activity records at both a process level and a step level may also be maintained by the server, including information related to which processes or steps were executed, by whom, at what time, and how long they took. Process developers may find these statistical reports extremely useful when optimizing the design of processes.

The process server may enable the customization of processes. In one embodiment, the process server may allow process developers to develop baseline business processes that can then be modified by the end users to fit their specific needs. The process server may manage these customized processes as a series of layers, in which the descendant process inherits the attributes of its parent. The inherited attributes of a child process may be overridden, and may also be extended by enabling additional attributes.

The process server may also reconcile multiple versions of a process. At times more than one version of a process may be active within an organization; this may be the result of a change in the process design while several processes were pending. The process server may internally manage the execution of multiple versions of the same process by keeping track of the version of each active process instance independently. This version control feature may help contribute to a rapid modification and deployment framework for business processes.

Figure 6:
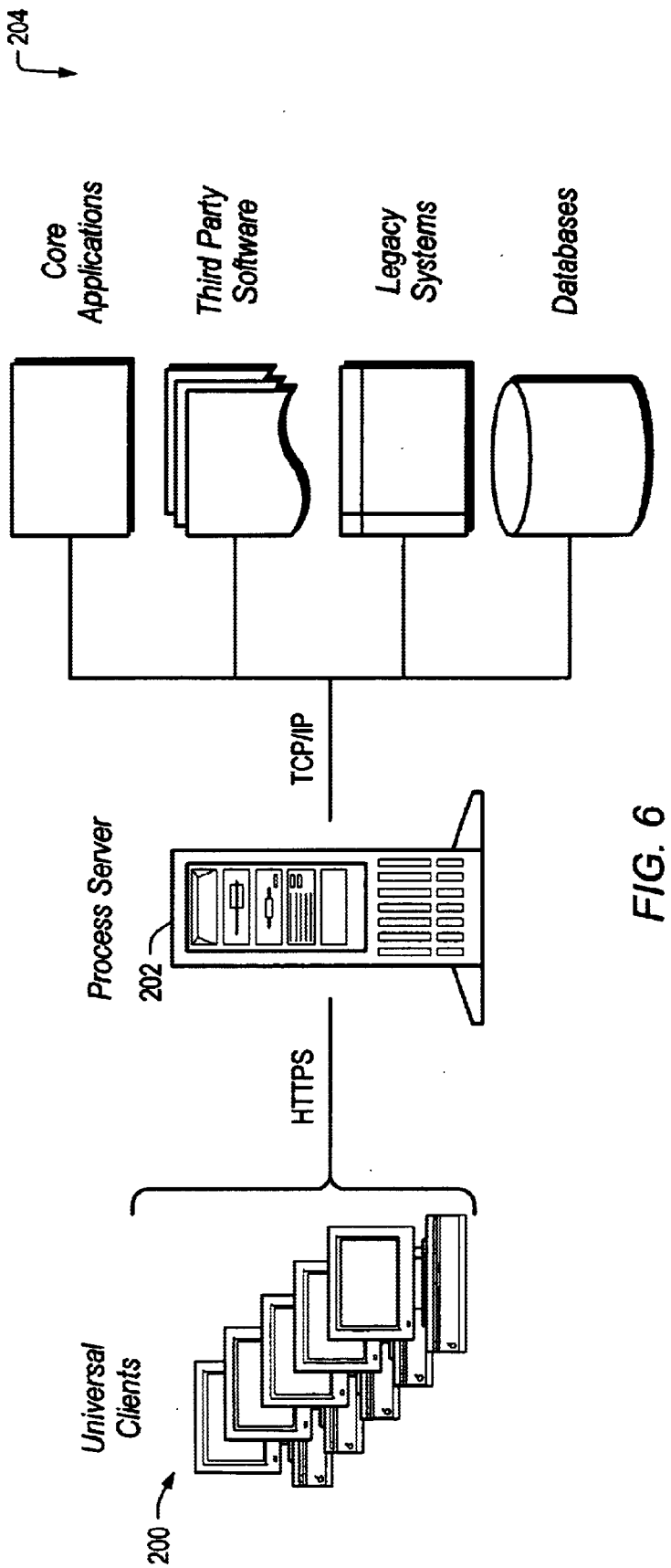
FIG. 6 illustrates a high-level view of how universal clients, a process server, and existing back-end systems may fit together in a generic corporate IT environment.

Turning now to FIG. 6, a high-level view of how universal clients 200, a process server 202, and existing back-end systems 204 may fit together in a generic corporate IT environment is depicted. This diagram illustrates that the process server 202 may act as a broker of the firm's various information systems 204, and allows a common goal-based user interface for the various processes that access these systems to be provided through universal clients 200 as described above. In a preferred embodiment, the universal clients 200 request processes from the process server 202 using HTTPS as a transport mechanism. In a preferred embodiment, the process server 202 provides a process one step at a time in XML to the requesting universal client. In such embodiments, the universal clients 200 may be launched from an existing web server and use the web server to communicate with the process server 202. In a preferred embodiment, the universal clients may run as Java applets under the Java virtual machine of an existing web browser. In other embodiments, the universal clients may be implemented independently with their own HTTPS interface either as an executable on the user's computer or within a Java virtual machine for example. For Java or similar implementations of the universal client, the universal client may initially be downloaded from a server when first launched. Thereafter, the universal client may be cached and only reloaded if a version change has occurred. The process server 202 may communicate with the back-end systems 204 over an enterprise network using TCP/IP. Note that in other embodiments, other transport mechanisms and languages may be employed.

The universal clients and process server provide a data-driven process framework that provides a structured method for integrating all of the applications and databases that a person would involve in a business process. All of the data that is required to define and execute a process within this framework may jointly be referred to as metadata. This powerful framework may allow businesses to control process functionality by simply distributing the data that defines the process over the network instead of the traditional, time- and labor-intensive method of distributing executables. All of the process data that is required to define and execute a process may be defined in metadata, as well as the process administration data, such as the user, role, and organizational data that is necessary for the management of workflow and access by users. All metadata may be stored in a metadata process database, which may be an OBDC-compliant relational database.

Figure 7:
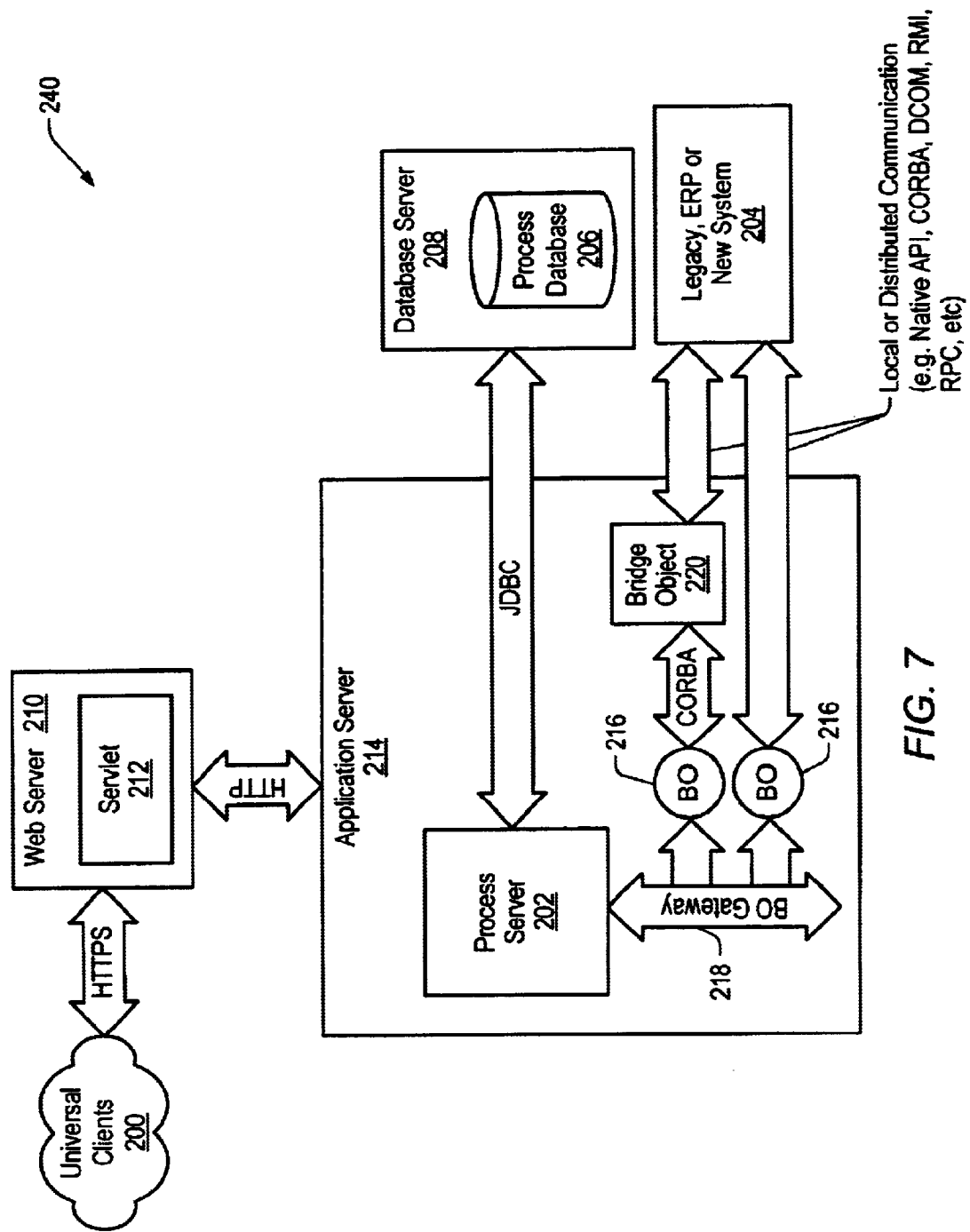
FIG. 7 illustrates a block diagram of one embodiment of a process-based enterprise computer system employing universal clients, a process server, and a process database.

Turning now to FIG. 7, a block diagram illustrates one embodiment of a process-based enterprise computer system 240 employing universal clients 200, process server 202, and process database 206. Universal clients 200 communicate with process server 202 via HTTPS (HyperText Transport Protocol (HTTP) over Secure Sockets Layer (SSL)) through a standardized web server 210. Other transport and security protocols may be used in other embodiments. Inside the web server 210 is a communication servlet 212 which manages the communication gateway into the process server 202. The process server 202 may actually be an application running (and managed by) an application server 214, such as the NetDynamics Application Server. The process server 202 communicates with the process database 206 via a database server 208. In one embodiment, the process server 202 may communicate with the process database using JDBC (Java DataBase Connectivity). The process server 202 communicates with the back-end enterprise systems 204 using business objects (BO) 216 through a business object gateway 218. In a preferred embodiment, each business object is a Java class that implements a specific interface to allow communication between the process server 202 and the back-end systems 204. Business objects may communicate via CORBA or some other local or distributed communication protocol with Java bindings or some other bridge object 220 to bridge the native interface to Java. The business objects 216 may be capable of accessing both data and functionality (if an interface is provided) in a Legacy, ERP, Best of Breed, New System or other back-end systems used in an enterprise. It is to be understood that in other embodiments, different transport protocols and communication interfaces may be employed. Also, while the process server 202 is illustrated in FIG. 7 as running under application server 214 and communicating with universal clients 200 through servlet 212 and standard web server 210, other embodiments are certainly contemplated. An advantage of FIG. 7 is that the process server may leverage off the existing communication interfaces provided by standard web server 210 and application server 214. However, in other embodiments, this functionality may be implemented partly or entirely within process server 202. Also note that the components of FIG. 7 may be distributed across one or more computers. For example, web server 210 may be located on one computer, process server 202 on a second computer, and process database 206 on a third computer.

Figure 8:
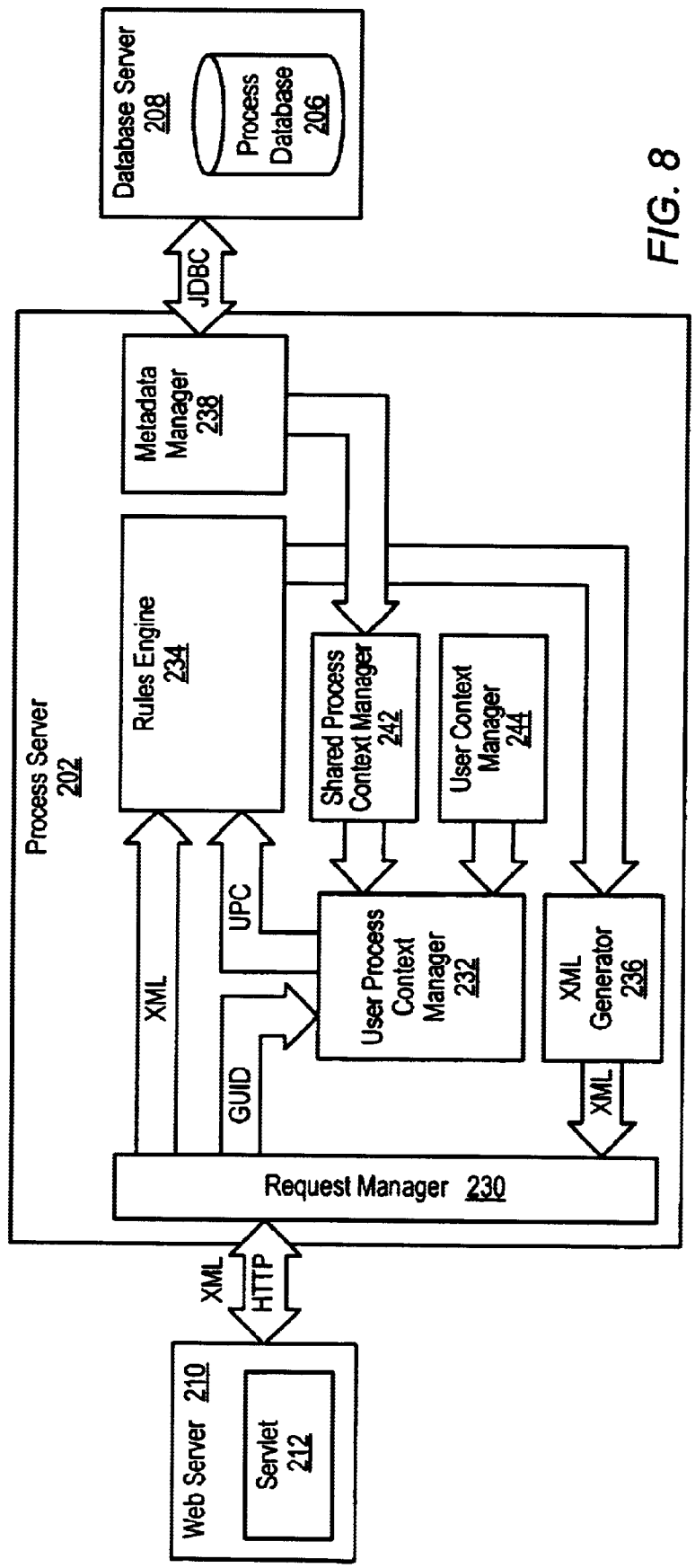
FIG. 8 illustrates a more detailed block diagram of one embodiment of process server.

Turning now to FIG. 8, a more detailed block diagram of one embodiment of process server 202 is illustrated. Primary components of process server 202 are illustrated. A request manager 230 receives raw XML as it is passed from the servlet 212. The request manager 230 is responsible for managing communications between the process server 202 and servlet 212. The requests manager 230 breaks out a GUID (Guaranteed Unique Identifier) from the XML message and passes it along to a user process context (UPC) manager 232. The UPC manager 232 is responsible for producing a new UPC for the given request (if none exists) or matching up the existing UPC with the given request. A UPC is the current representation of the executed process, its business objects and data repository. The data repository is a holding place for all data elements required by a business process that do not belong to a business process. It can be thought of as a pool of data elements. If the business process designer needs to keep a variable around throughout a process, then they can programmatically (either through data mapping or through a user procedure) place it in the data repository. From that point forward, the process can access and manipulate the data element independently.

Once the appropriate UPC is created/matched up, it is passed along with the raw XML to a rules engine 234. The rules engine 234 is a specialized state engine for business processes. Its job is to respond appropriately to the request made by a universal client based on the current state of the process. For example, the request passed to the server may be a Next navigation event coming from the universal client. In this case, the rules engine 234 assesses the current location of the process and advances the state appropriately forward. Once the state has moved forward, the rules engine 234 collects up all of the pertinent information necessary to render the next step on the universal client and sends that information to XML generator 236 which prepares the XML to be passed back to the universal client. The rules engine 234 is able to do its job with the assistance of three other components: metadata manager 238, shared process context manager 242 and a user context manager 244. The metadata manager 238 is responsible for pulling all of the necessary process data out of the process database 206 for use by the rules engine 234. Because the same process may be executed by many users, a copy of each requested process definition may be cached and maintained in the shared process context manager 242 for a configurable period of time. When a new UPC is being created, it looks first for the requested process in a shared process cache for a representation of the process. If it does not exist, the shared process context manager 242 requests it from the metadata manager 238. The user context manager 244 maintains information about the user connection. This component may keep an eye on the activity for each user and may time out processes that have not been executed in a given time out period.

Figure 9:
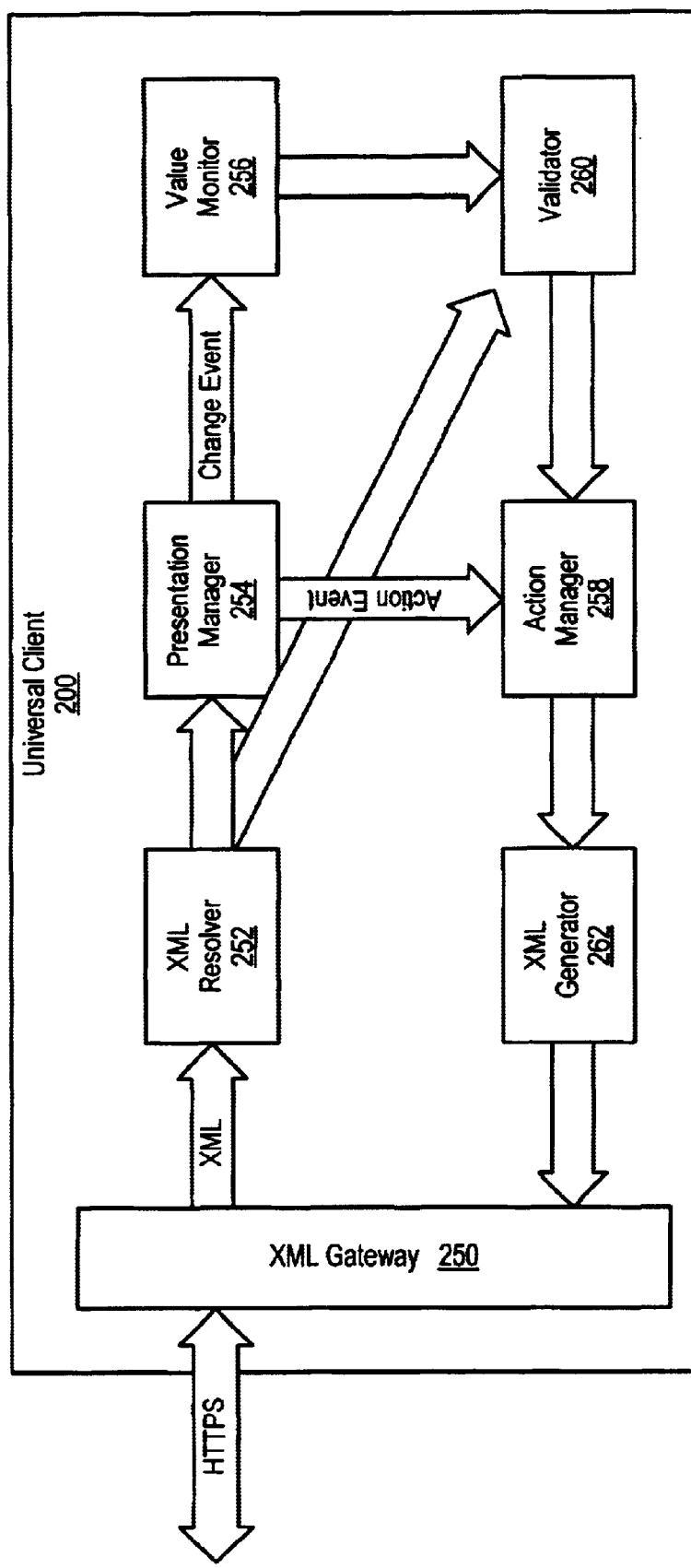
FIG. 9 illustrates a block diagram of a universal client.

Turning now to FIG. 9, a block diagram of a universal client 200 is illustrated. This diagram shows the primary components for one embodiment of a universal client 200. An XML gateway 250 parses the HTTP response from the process server and feeds the raw XML to an XML resolver 252. The XML resolver 252 is responsible for parsing the XML tree to determine how the response should be presented in the user interface. Each screen and screen component is parsed, dynamically created and placed in the appropriate place in the user interface by a presentation manager 254. For each component created and placed under control of the presentation manager 254, a change event listener is registered with a value monitor 256. The value monitor 256 may be a simple hash table with NameNalue pairs representing each value as it is currently presented. When the user updates values on the screen, the value monitor 256 is notified of the change and updates its associated value in the hash table. When the user clicks on one of the navigation options, an action event triggers an action manager 258 to prepare the client data to return to the server. A validator 260 first validates all of the data currently maintained in the value monitor 256 based on basic and specialized validation rules that it receives from the XML resolver 252. Once all data validations have passed, the action manager 258 passes along all changed data to an XML generator 262 which formats the XML for the trip back to the process server.

Focusing now on communication between the process server and back-end systems, as mentioned above, business objects may be created to provide access to back-end data required in a process. Business objects filter and logically group data from one or more back-end systems so that this data can then be used in a process step. Business objects contain the logic required to retrieve data from an external application or data source, and they may also contain logic to update the data source or to massage and combine data from multiple back-end systems. A business object may be a reusable object that has behavior and data that it acts upon that is related. For example, a business object might provide all of the data and behavior required to represent a customer. This could include address, contact information, invoice data, accounts receivable data, etc. An object designer may break apart business objects into stand-alone units where the customer object actually references data in a separate object for invoices and another for accounts receivable. Business objects may reusable so that different processes can be built upon them.

In one embodiment, business objects may be named Java classes that provide access to any external data required during the design and execution of business processes. Each step within a process will often only deal with a subset of data from back-end systems. Business objects filter and logically group data from one or more back-end systems so that this data can then be used in the process step. Business objects may also contain the logic to massage and combine data from multiple back-end systems.

Figure 10:
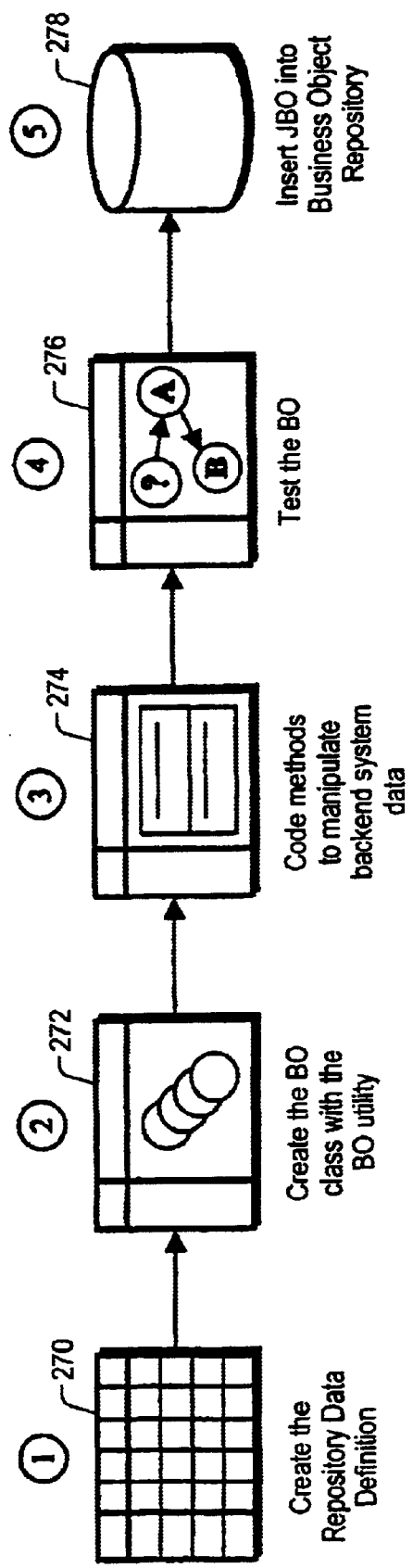
FIG. 10 illustrates a flow chart for the creation of a business process.

A data access administrator may create and maintain business objects. A general sequence of steps that lead to the creation of a business process is illustrated in the flowchart of FIG. 10. The data access administrator first creates a repository data definition (RDD) that describes the business object data, as indicated at 270. A RDD is a definition of the data elements that are contained in a business object. In a preferred embodiment, the format for the RDD is XML, and it specifies at a field level the BO name, data type, and other attributes that are necessary to describe the BO. Creating the RDD is the first step when producing a new BO. A business object utility will then read the RDD and create the BO class skeleton, which implements the BO interface, as indicated at 272. The data access administrator completes the class by coding the appropriate calls that will be used to manipulate the back-end system data, as indicated at 274. After testing the BO to ensure that the calls operate correctly, as indicated at 276, the data access administrator inserts the newly created BO into a business object repository, as indicated at 278. The business object repository may be part of the process database. The BO repository may be a table within the process database that contains the logical name of each BO and maps it to the BO class name that exists on the process server. At runtime the process metadata will point to the logical names of BOs and the process server will reference the BO repository to locate the actual BO class on the system.

Business objects only have to be created once. After they have been inserted into the business object repository, they are made available for use within any business process. Since BOs are named, process developers can link them by name to a step in a new or existing business process.

Figure 11:
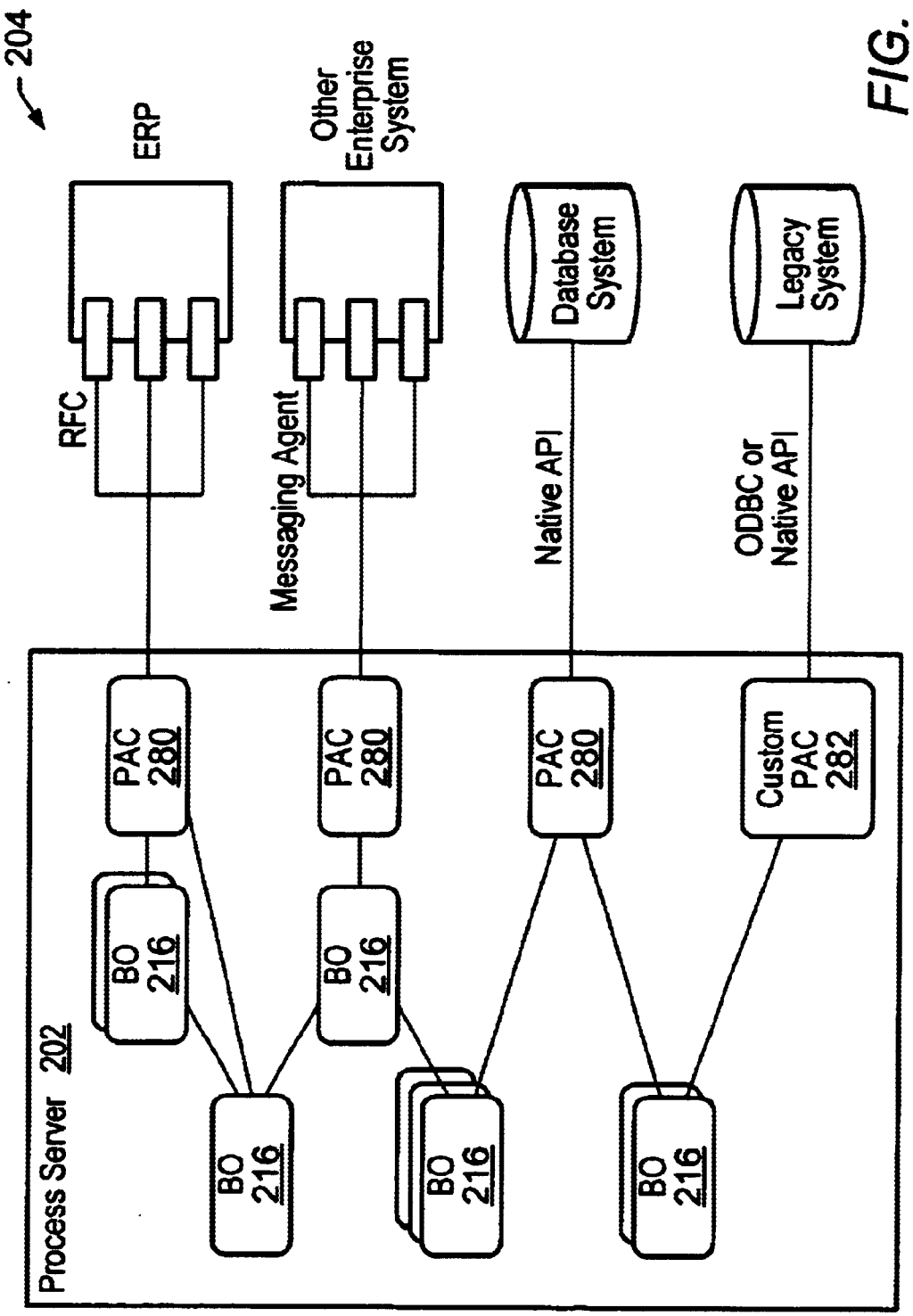
FIG. 11 illustrates one embodiment of how business objects may be used to connect to back-end systems.

Turning now to FIG. 11, a diagram illustrates one embodiment of how business objects 216 may be used to connect to back-end systems 204. The open business object architecture provides a great deal of flexibility in how the process server 202 may connect to an enterprise's back-end applications and databases 204. The business objects 216 are the boundary between the process server 202 and back-end systems 204. The BOs 216 provide an abstraction layer that enables a process developer to consider external application data within the context of a process implemented through the process server 202 and universal client, independent of the specific back-end system. The specific calls to retrieve and convert the data are encapsulated within the BOs 216.

A standard interface may be understood by the process server 202 so that the server 202 does not need to understand the specifics of the back-end systems 204 with which the BOs 216 will interact. The only constraints on what a BO may connect to are the language bindings provided by the API vendor. Most application vendors provide C++ or Java bindings, and these are both supported by standard object request brokers (ORBs) such as the Visigenic ORB.

In a preferred embodiment, the process server 202 may leverage the language-independent CORBA IDL interface to allow connectivity to virtually any application that provides an API. This includes the standard database interfaces, ODBC and JDBC, as well as native interfaces to databases and other applications. In one embodiment, the process server 202 may also leverage off of platform adaptor components 280 provided by an application server in which the process server 202 is running, such as the platform adaptor components (PACs) supplied by NetDynamics. In conjunction with supplied PACs 280, or alternatively to supplied PACs 280, custom PACs 282 may be designed. A PAC is an interface platform that is based on the CORBA standard and provides integration with enterprise applications, transaction monitors, and databases, as well as a host of other services and applications. Business objects 216 may make direct calls to PACs 280, 282. In other embodiments, such as when the process server is not running under an existing application server, the functionality of PACs may be included within the BOs or another component. Other embodiments may use other methods to call a back-end system.

In addition to creating business objects, a process administrator may set up an organization's users, roles, and structures to enable certain access control and workflow features. Using a process designer tool, the process administrator may associate users and roles within an organizational hierarchy. In addition, the process administrator may set up process categories, which may be used to manage users' personalized launch pads in the universal clients throughout the enterprise. These categories are organized hierarchically to allow users to easily locate the process that they need using their launch pad. The process administrator may restrict access to processes by role or user by specifying who is allowed to access each category and/or process.

Once business objects have been created, they are available to be linked to steps or screens by the process developer as he develops or edits business processes. During process execution, the universal client and process server work together to actually carry out the business process.

The process developer may create all the metadata required to define a process by using a tool to directly create and edit process metadata in the process database, or by using a graphical process design tool. When using the latter, the process developer is able to generate processes graphically, and a detailed knowledge of the metadata format is not required. Defining a new process may include using one of these tools to arrange the steps of the process, associate a screen with each process step, and then optionally link the screen to a business object.

Figure 12:
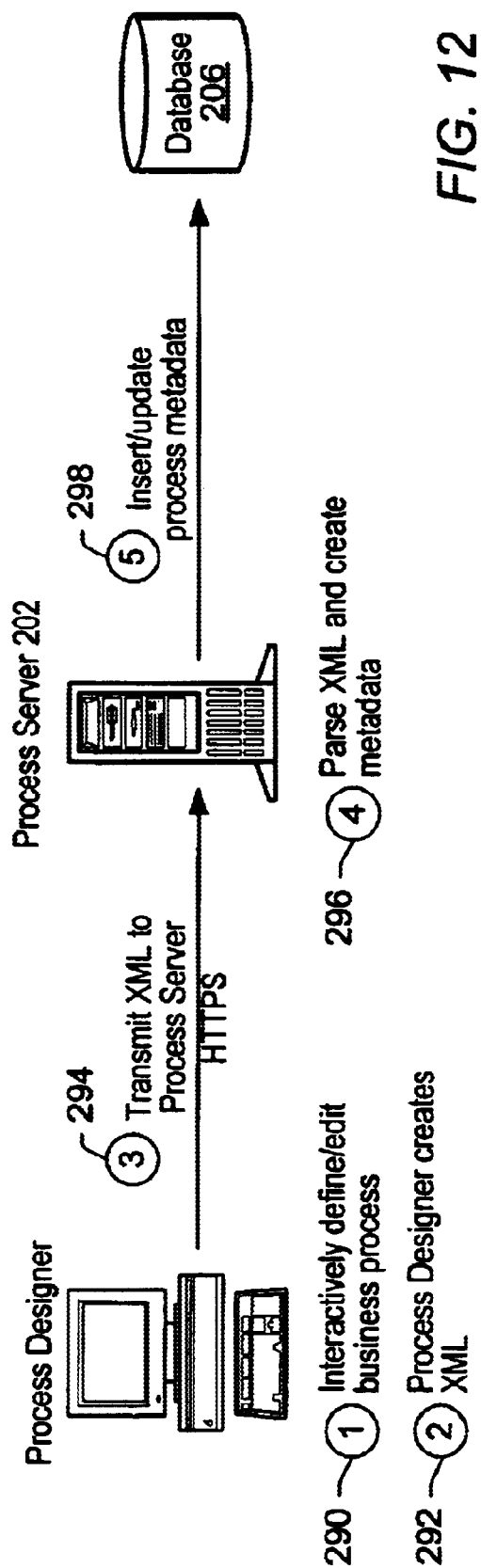
FIG. 12 illustrates a process design flow.

FIG. 12 illustrates the process design flow. A process designer defines and/or edits, as indicated at 290. After the process developer edits the business process, the process designer tool will format the metadata, as indicated at 292. In a preferred embodiment, the metadata is formatted in XML. The metadata will be transmitted to the process server 202 over HTTPS in a preferred embodiment, as indicated at 294. Then the process server 202 will parse the XML and create the metadata to be saved that represents the process defined by the process developer, as indicated at 296. The process server 202 will insert the metadata into the process database 206 for a new process or update the metadata in the database 206 for an existing process that had changed, as indicated at 298.

A process developer is the person responsible for designing an organization's business processes, and this role may be performed by a business analyst or domain expert. The screen-level design framework represents a powerful process development and deployment technique. The process development tools allow the process developer to avoid creating new software components or screens for each additional business process. Instead of concentrating on these time-consuming tasks, the process developer only has to select the screens that will be used in the process, modify the attributes of these screens, and then connect each screen to a business object (BO). Developers may rapidly design and deploy business processes since this screen-based process development takes care of many typical system development activities, such as component design, screen layout, standard field validation, version control, and backend system data mapping.

A user may initiate the execution of a business process from a launch pad screen or similar screen within the universal client. To initiate a new or pending process, the user selects the desired process from a list on the launch pad. In some embodiments, the list of processes may be a "to do" list personalized for the particular user. In another embodiment, processes may be started from a desktop icon that is dedicated to the execution of a process. Regardless of the initiation approach, the universal client makes a request over HTTPS to the process server to execute the selected process. The server references the appropriate metadata that is stored in the process database, and then determines the initial step for the process. If a connection to a backend application or data source is required for the screen, the server also may call the backend system through a business object and platform adaptor component (PAC) as described above.

Figure 13:
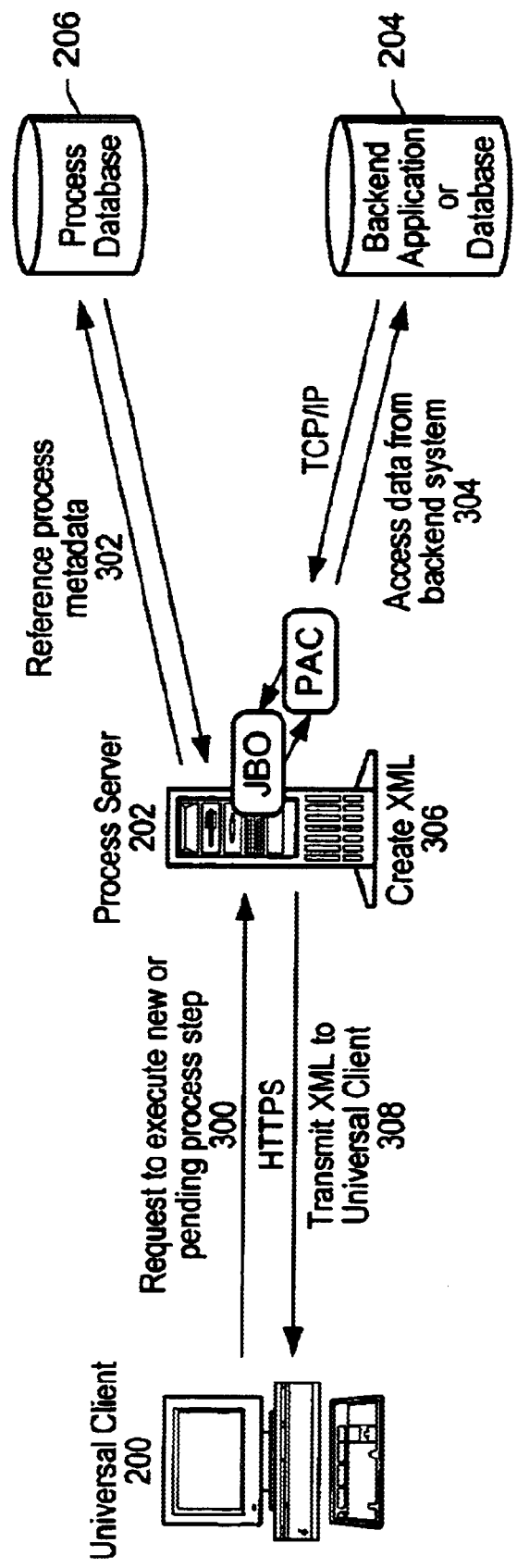
FIG. 13 illustrates process-based computing employing a universal client and process server.

Turning now to FIG. 13, process-based computing employing a universal client 200 and process server is illustrated. A request to execute a new or pending process step is transmitted to the process server 202, as indicated at 300. The request may come from the launch of a new process or navigation within an existing process. The process server 202 references the process metadata from the process database 206, as indicated at 302. The process server 202 may also access any associated process or application data from a back-end database or application 204, as indicated at 304. The process server 202 then generates the XML response that is necessary to define the screen, as indicated at 306. The process server 202 transmits the XML response back to the universal client 200 over HTTPS, as indicated at 308, and the client parses this response to produce the screen and its contents for the user. Upon clicking a navigation button at the completion of the process step, the universal client may prepare an XML request that incorporates the data that was entered on the screen, along with the user's action. The process server interprets the XML request sent from the universal client, and then the cycle repeats itself for the next step in the process.

Throughout the execution of a process launched from universal clients, the process server maintains the state of the active process for each client and a data repository of all data associated with each active process. The data repository is a holding place for all data elements required by a business and not supplied by one of the utilized business objects. It can be thought of as a pool of data elements. If the business process designer needs to keep a variable around throughout a process, then they can programmatically (either through data mapping or through a user procedure) place it in the data repository. From that point forward, the process may access and manipulate the data element independently. The process server also controls the flow of the process when navigation requests are received from the universal client. To accomplish this, the rules engine of the process server evaluates the process metadata against the step data returned from the universal client to determine the next step of the process. The process server also manages all connections and activities involving back-end applications or data sources.

Figure 14A:
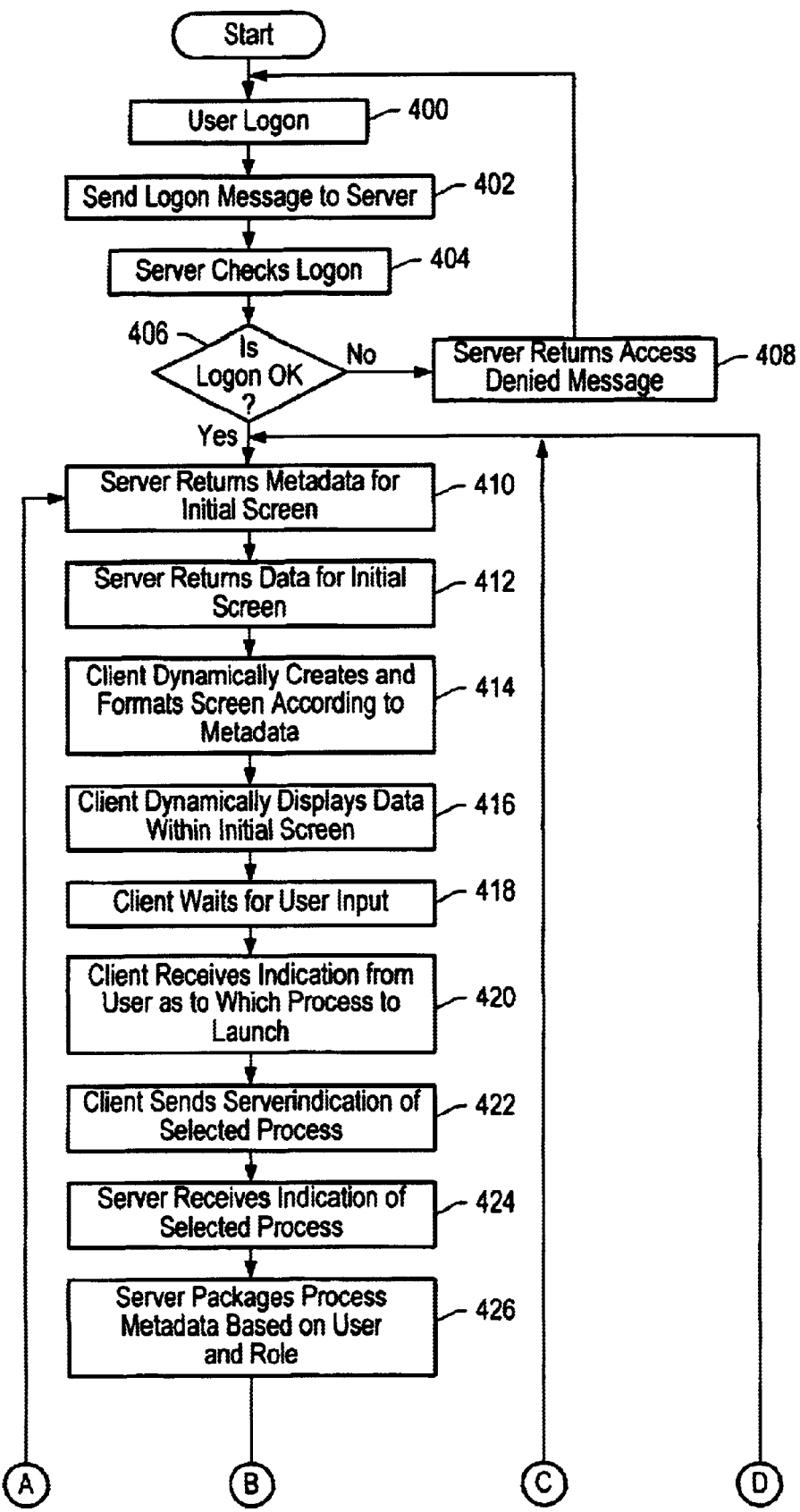
FIGS. 14A and 14B, illustrate a flow diagram of one example of process-based computing with a universal client and process server.
Figure 14B:
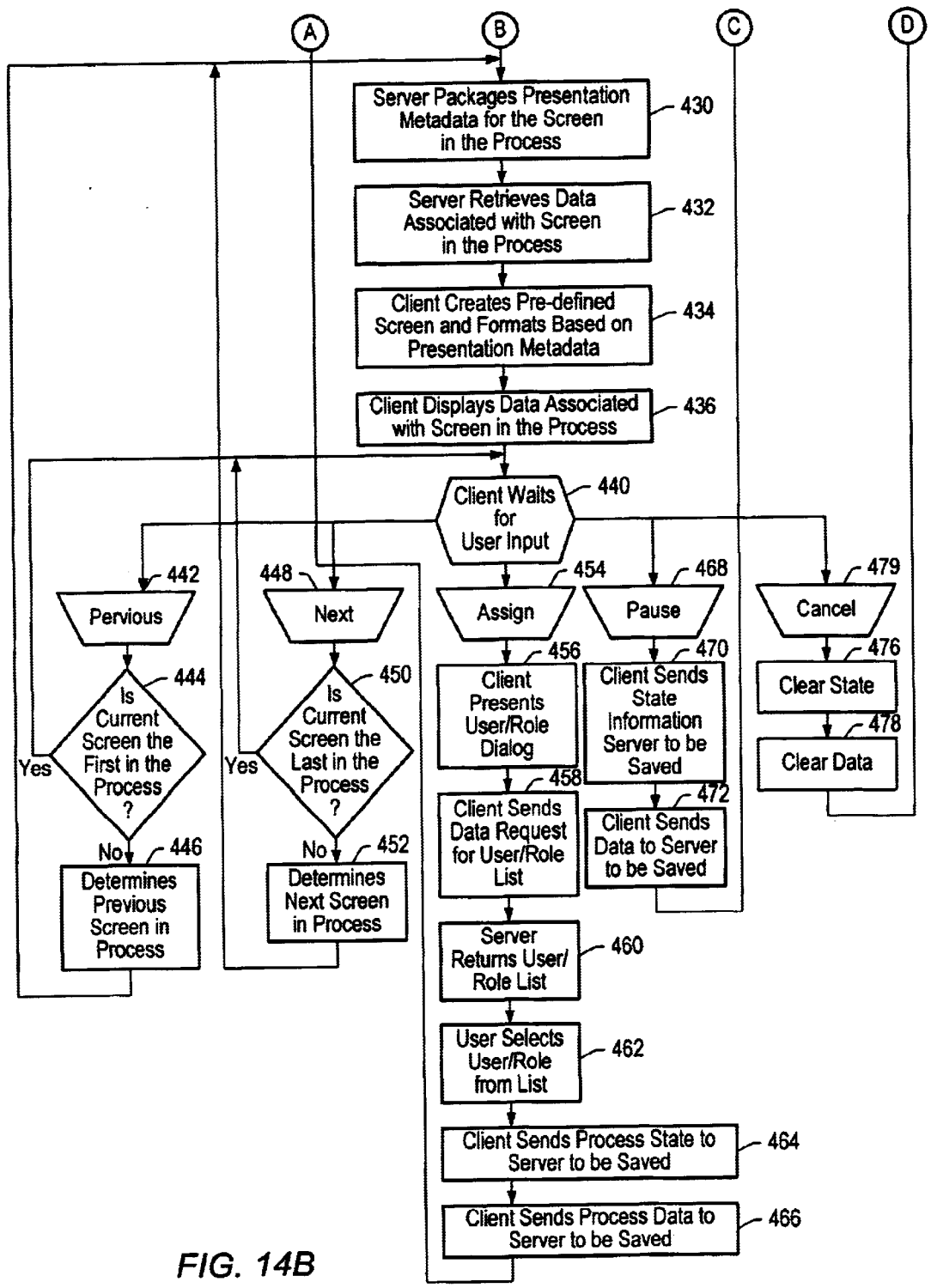

Referring now to FIGS. 14A and 14B, a flow diagram is provided illustrating one example of process-based computing with a universal client and process server. A user may log on to the system at a client workstation, as indicated at 400. A log-on message may be sent, as indicated at 402, to the process server. An administration system of the process server may check to see if the user is registered, as indicated at 404.

If the log-on is not acceptable, at 206, the server may return a message to the client, as indicated at 408 that the log-on was not accepted, and the process returns to 400.

If the log-on is accepted, the server may send to the client presentation metadata for an initial screen, as indicated at 410, which the server may be programmed to send based on the user's log-on. This metadata may be stored in the process database. In a preferred embodiment, the initial screen is a "to do" or task list, which is used to list all of the tasks that the user has been assigned to do. At 412, the server transmits data that will be displayed within the initial screen. For example, this data would be information on the actual listing of tasks for that user. The presentation manager in the client then dynamically renders and formats the initial screen according to the presentation metadata, as indicated at 414. The client may also dynamically display data received from the server within the screen, as indicated at 416. The client then waits for a user input, as indicated 418.

At 420, the client receives an indication from the user as to which process to launch. This would be, in a preferred embodiment, the user selecting a specific task from a to do list. The client then sends to the server, at 422, and the server receives, at 424, the indication of the process selected. The server, at 426, retrieves process metadata from the metadata database and packages the process metadata, based on the selected process. The selection of metadata by the process server may also be based on the user and the user's defined roles. The process metadata may identify the steps of the process by name, and includes things such as conditions which will be checked before going on to the next step, conditional branches and jumps, as well as the names of sub-processes to execute. At 430, the metadata manager of the server may package together presentation metadata for the first screen in the process, and retrieve, at 432, data associated with that presentation metadata from a legacy database or other available database or application. At 434, based on the presentation metadata, the presentation manager of the universal client may renders on a display the standard screen type identified in the presentation metadata and formats the screen for the particular process step based on the presentation metadata. The client then displays the data sent by the server in the screen type, as indicated at 436.

At 240, the process waits for a user input from one of navigation buttons which are displayed on the screens. Preferably, the buttons are located on a frame which is displayed around every screen, such as is shown in FIGS. 3–5. If the "previous" button is clicked on, and if the currently displayed screen is not the first screen in the process, as indicated by decision block 444, the previous screen or step is determined, as indicated at 446. The process then loops back to 430 to display the previous screen. If the "next" button 448 is pushed, and if the current screen is not the last screen, as indicated by 450, the previous step/screen is determined. The process then loops back to 430, where the server packages presentation metadata and the data for the next screen. Although not illustrated, in some embodiments the user may not be allowed to go to the next step if data that has been entered by the user does not meet pre-defined edit(s) defined in the process metadata, or is not valid.

If the "assign" button 454 is clicked at any point in the process—for example, when a few steps of the process have been completed by one user, and the remaining steps need to be, or the user wants them to be, completed by another user—the client may present in a window on the display screen a pre-defined user/role dialog box at 456 and send a request to the server for data for user/role list at 458 of people to whom the process, at that point may be assigned. The server processes the request and returns the list at 460, whereupon the client displays the list in the dialog box. The user then selects at 462 a particular user to whom, or particular role or job to which, the current process is to be assigned. The client then sends to the server its current state and any data entered, as indicated at 464 and 466. The process may then loops to 410. To pause a process for resumption later, a user clicks "pause" button 468. The client sends to the server any state and data information, as indicated at 470 and 472. If a user wants to cancel what has been done in the process, the user clicks "cancel" button 474, and the process state and any entered data may be cleared, as indicated at 476 and 478.

The above example is merely illustrative of one embodiment of the process flow and user interaction using a universal client, process server and predefined processes as described herein.

In a preferred embodiment, the universal client functions as a "browser" of processes and steps. A user selects a process and navigates through processes using the universal client. The entire executables for a process do not need to reside on a user's computer. When a process is selected in the universal client, the process server provides the data necessary to implement each step one step at a time. Steps or screens may be cached to improve performance. Version checking may be performed to reload any cached data if changes have been made in the process database. By dynamically downloading process steps as needed, resources may be conserved on the users' computers. Also, since processes are dynamically updated from the server, version control is easily maintained. To update a process, the process developer need only update the process in the process database. When a user requests the process, he automatically receives the latest version. Thus, an enterprise's IT department does not have to update every user's computer. In a preferred embodiment, the universal client may also be downloaded by the server to a user's computer when a user first launches the universal client. The universal client may then be stored on the user's computer and automatically reloaded if a new version is available. This architecture also simplifies remotes access to the process server. For example, a user could download a universal client over the Internet to his home computer.

The universal client interacting with a process server as described herein provides a useful and efficient process-based computing mechanism. Processes may be predefined and stored in a process database. As mentioned above, a tool(s) may be provided to assist the process developer in designing processes for an enterprise. This tool may allow direct editing of process metadata to be stored in the process database. Also, a more sophisticated graphical process development tool may be provided that a process developer may use to define, edit, and review business processes. The process development tool may also contain functionality to conveniently manage the processes within the enterprise. The process development tool may be referred to as a process designer.

The process designer may be used to describe each process step as one or more of the screen types discussed above. Using a process designer tool, the process developer may drill-down within each process step to lay out the screen types required to represent the activity. Process properties sheets may also be edited to set process, screen, and component attributes. In a preferred embodiment, the process designer allows the developer to design a process by "drag and drop" editing of screen types and business objects between the screens. This graphical screen-based programming of processes may drastically reduce process development time. In addition, the process designer allows each process step to include more than one screen type.

A graphical presentation of designed business process or a process being designed, may be provided by the process designer tool. A high-level flowchart diagram view of a process enables a process developer to logically describe the activities and flow of the business process independent of the backend systems or client screen types. The process developer may use the flowchart view to build or modify a business process by performing "drag and drop" manipulations of icons representing the specific client screens needed.

The process designer may allow the process developer to specify the step transition for each step of the process. A step transition is a generic term used to describe the action between steps in a business process. The process designer may allow the developer to specify several types of step transitions which determine how the rules engine of the process server moves from step to step. Example step transitions are: 1) SEQUENTIAL (single step resolution), 2) CONDITIONAL (branching transitions each with a rule to determine which branch to take—the first one to resolve to true wins), 3) PARALLEL (branching transitions each with no rule—all branches are taken), 4) LOOPING (transition resolving to a prior step—typically associated with a CONDITIONAL transition). The process designer also allows the process developer to specify a purpose for each screen type selected for a process step. Screen purposes were described above.

The process designer tool may also allow management of workflow and data resource links. Each screen may be linked to business objects that will access the enterprise's backend systems. This may graphically be done by "drag and drop" editing of business objects and screen types. The process designer tool may also enable the process developer to provide component- and step-level validation classes. In addition, automatic role assignments may be established for different users and step- and process-level triggers that launch other activities or processes may be setup. Also, a direct editor, such as a Java code editor, may be provided to directly edit and create business objects, validation classes, and step transition condition classes in the database.

As described above, the process designer may also create the metadata required to execute a business process. Once the process has been defined, the process designer may automatically generate the metadata that describes the process. In a preferred embodiment, this metadata may be formatted in XML and transmitted to the process server, which saves the metadata in the process database. The process designer may also allow direct entry of the metadata into the process database.

The process designer tool may also allow the process developer to edit existing business processes. The same functionality that the process developer used to create a new business process may be used to easily edit an existing business process. In this case, the process designer retrieves the process metadata from the process server, permits the process developer to edit the process, and finally sends the revised process metadata in XML format back to the server. The process designer may also allow direct editing of the process metadata in the process database. The process designer may ensure referential integrity of the data and data validation when direct editing or creation is used.

The process designer tool may also enable administration of users, roles, and organizational structure within an enterprise. A process administrator may set up the users, roles, and organizational structures so that the process server may guarantee restricted access to business processes throughout the enterprise, and initiate automated workflow features within and among processes, such as transferring a process to a different user after a step has been completed. The process designer may be used to add, edit, and delete the users, functional roles, and positions within an organization. A graphical representation of organization structure and roles may be provided.

The process designer may also configure process distribution. The process administrator may manage the launch pad screen across the enterprise, which means controlling who may access a process, as well as how and when it may be accessed. This may be accomplished by assigning processes to one or more logical groups, or process categories. Process categories may be added, modified, or deleted using the process designer. These categories are mapped to the organization's users, roles, and structure to provide each user with a personalized launch pad based on their individual processes.

The process designer tool provides for rapid process definition and administration. By simply selecting screen types, screen purposes, and business objects, a developer may create almost any business process. Graphical editing, such as "drag and drop" editing, may greatly facilitate process development. The process designer and the process server automatically perform all data and method mappings. For example, by examining the data types of the data that the process developer associated with a screen type, the process server automatically selects the appropriate component format and location to display the data. The examination of data and mapping by the process server may be done dynamically. This automatic mapping greatly reduces development time by saving the developer from having to directly code all of the data mappings.

However, in some cases the developer may not desire the default mapping performed by the process server. Sometimes, however, the default "look and feel" of rendered data elements is not sufficient. In this case, the process designer allows the developer to override the default by specifying component overrides. It is in the override situation that components are even specified, otherwise they are determined at run-time.

As noted above, data mapping is required for screen specialization from a data perspective. While "programming" a screen only requires the developer to select a screen type, purpose, and business object, the process server must make numerous assumptions. One of those assumptions is that all of the data elements in a business object will be mapped to the screen unless otherwise specified. However, the process designer may provide for custom data mapping. There are four types of data mapping: 1) PRE—SCREEN, 2) TO—SCREEN, 3) FROM—SCREEN and 4) POST—SCREEN. PRE—SCREEN identifies the elements that need to be moved prior to the execution of a screen. TO—SCREEN identifies the elements to appear on the client interface. FROM—SCREEN identifies the elements to be returned from the client interface. POST—SCREEN identifies the elements that need to be moved subsequent to the execution of a screen. Custom data mapping is not necessary, however, but may be used if the process server makes assumptions the developer did not intend.

The process server also automatically performs method mapping to specify screen behavior. Like the assumptions around data mapping, the process server makes certain assumptions about which methods are called in the business object based on the screen type and designated purpose. If the default behavior is not sufficient for the particular screen, then any method or combination of methods can be specified to be called both before (PRE—SCREEN) and after (POST—SCREEN) the execution of the screen on the client interface.

The process designer also allows a developer to add user procedures. A user procedure is a segment of code written to be executed at particular points in time relative to the execution of a business process. User procedures allow a process developer to provide functionality that is specific to the particular process being developed. The process designer may allow for the following locations for the placement of user procedures: 1) PRE/POST Process (prior to/post the execution of the first/last step in a business process), 2) PRE/POST Step (prior to/post the execution of a step), 3) PRE/POST Screen—Server (prior to/post the execution of a screen to be done on the server), 4) PRE/POST Screen—Client (prior to/post the execution of a screen to be done on the client) and 5) PRE/POST Component (prior to/post the focus of a component). If no code segment is specified for a particular screen, then the default behavior is considered to be sufficient.

Also, as mentioned above, a data repository may be available to the developer. The data repository may be a holding place for all data elements required by a business process that do not belong to a business process. It can be thought of as a pool of data elements. If the business process developer needs to keep a variable around throughout a process, then they can programmatically (either through data mapping or through a user procedure) place it in the data repository. From that point forward, the process can access and manipulate the data element independently.

Figure 15:
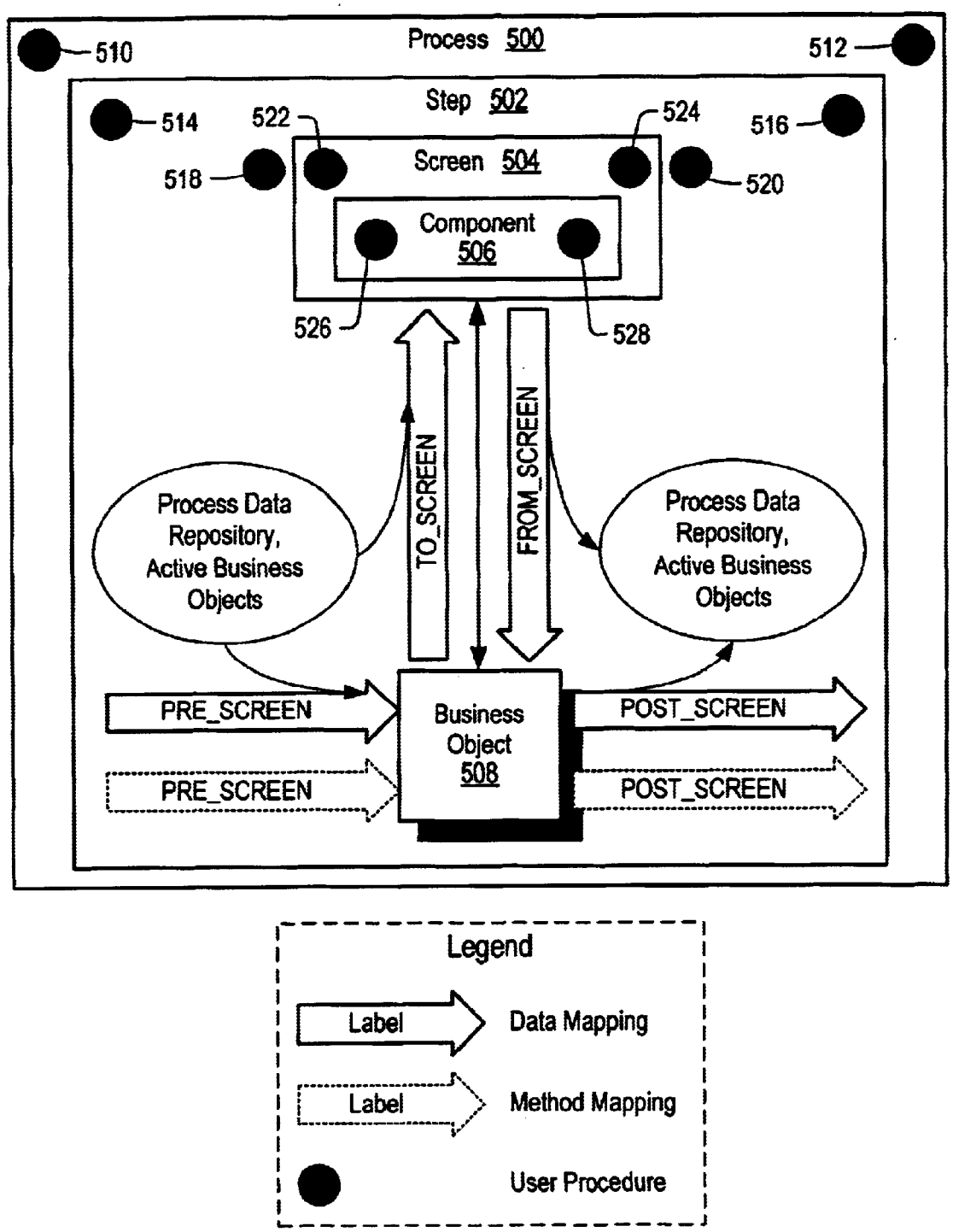
FIG. 15, illustrates the relationship between the objects which may be used to define a process.

Referring now to FIG. 15, a graphical illustration shows the relationship between the above-described objects. A process developer may design a process 500 to have one or more steps 502. Each step 502 may include one or more screens 504 which include one or more components 506. A business object 508 may be specified to provide an interface to back-end systems. Custom pre-, to-, from-, and post-screen data mappings may be specified which may utilize the data repository and active business objects. Also, custom pre- and post-screen behavior may be specified. Moreover, user procedures may be executed before the first step of a process, as indicated at 510, or after the last step of a process, as indicated at 512. Pre- and post-user procedures may also be specified for each step, as indicated by 514 and 516 respectively. Pre- and post-user procedures may also by specified for each screen to be performed by the process server, as indicated by 518 and 520 respectively, or by the client, as indicated at 522 and 524 respectively. Pre- and post-component user procedures may also be specified, as indicated by 526 and 528 respectively.

Figure 16:
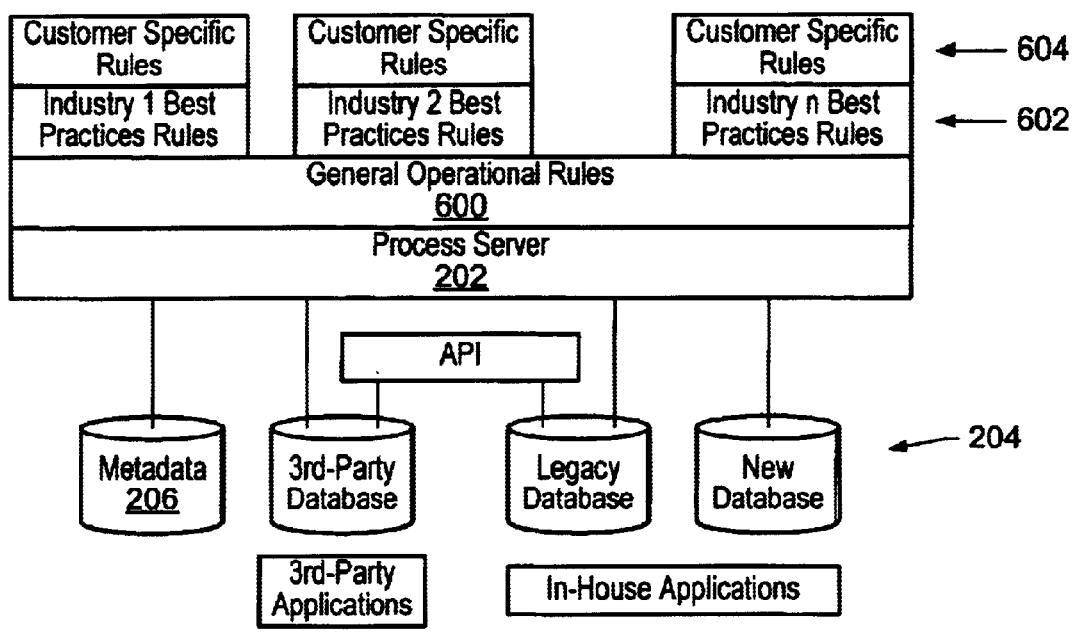
FIG. 16 illustrates layered process definition.

Referring now to FIG. 16, the metadata-based processes may be revised to build other processes and may be modified. Furthermore, different layers of metadata rules may be employed to implement processes. Layered over process server 202 may be general operation rules 600 which represent process rules for a broad range of data processing activities generally applicable to businesses and enterprises. These process rules may be incorporated into standard sets of metadata that then may be used by a wide range of businesses. Standard sets of metadata for industry best practice business rules 602 may also be prepared for specific industries 1 to N. Finally, metadata for customer or user specific rules 604 may be prepared to sit on top of the industry specific rules. The three layers may be used together to solve a wide range of enterprises' data processing needs.

The metadata for these rules may be stored in the process database 206. As previously mentioned, the process server 202 may access back-end systems 204. FIG. 16 illustrates that process and presentation metadata may be layered as shown in 600, 602 and 604 and that process server 202 may be capable of packaging the appropriate metadata from all three layers.

Figure 17:
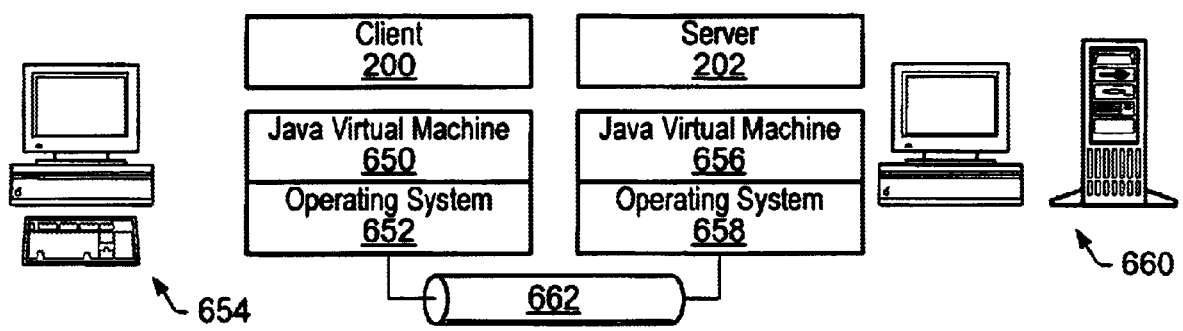
FIG. 17 illustrates a platform independent embodiment for a universal client and process server.

Referring now to FIG. 17, so that the processes of the client 200 and server 202 may be run on a wide variety of hardware and software platforms, they are preferably programmed in the Java programming language. The client processes, collectively illustrated by block 200, may function on top of a Java Virtual Machine 650, which may run on top of an operating system 652 on the client workstation 654. Similarly, the server processes, collectively represented by block 202, may sit on top of the Java Virtual Machine 656, which may sit on top of an operating system 658 for server computer 660. As previously mentioned, the client and the server may communicate using Internet protocols, as generally represented by pipe 662. Thus client and server processes may run on just about any computer and communicate with each other over a preexisting, world-wide, public network. Of course, FIG. 17 illustrates merely one configuration.

Figure 18:
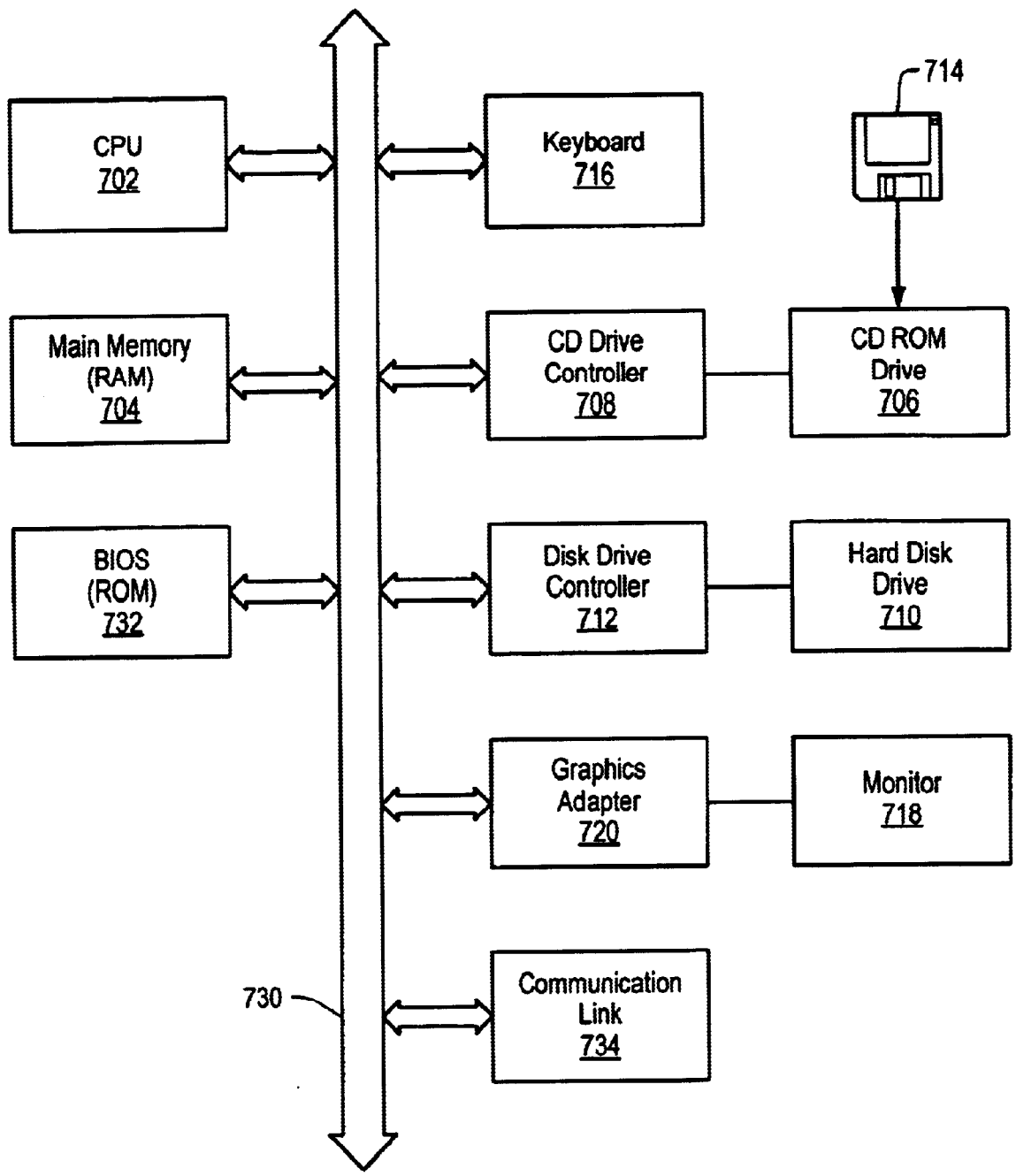
FIG. 18 is a simplified illustration of an example of a computer which may run a universal client or process server.

Referring to FIG. 18, an example of the main components of a general purpose, programmable, digital computer upon which the client or server may execute, are illustrated by a representative computer 700. In one embodiment, computer 700 may include a central processing unit (CPU) or processor 702 for manipulating data according to a program of instructions, and a main or working memory 704 for temporarily storing data, including program instructions. CD ROM drive 706 and its controller 708, and hard disk drive 710 and its controller 712 may be mass data storage devices. The CD ROM drive receives a removable, optical disk 714. Computers may include other types of mass data storage devices, such as floppy and tape drives. The computer 10 also may include various other peripheral components or I/O devices with which the CPU communicates, including, for example, a keyboard and/or mouse 716, a video monitor 718 and its graphics adapter 720. A communication link 734 may be provided for allowing the computer system to communicate with other systems across a network, intranet, the Internet, direct modem link, etc. Communication link 734 may be, e.g., a network interface card or a modem.

In the simplest form of the computer 10, the CPU, main memory, the mass data storage devices and the I/O devices communicate over a single system bus, which is designated 730 in the figure. However, most computers use more complex types of bus arrangements for enabling communication between the CPU, the main memory, and the various I/O devices. Also shown is also a separate, non-volatile, solid state read-only memory 732 for storing what is referred to as the "BIOS" or "Basic Input/Output System," which is permanently resident software, separate from an operating system. The invention is not, however, limited to any particular type of general purpose, programmable computer.

It should be understood that while certain potential advantages have been discussed, these advantages should not be considered to necessarily be characteristic of the described embodiments or limiting in any way. Although the system and method of the present invention has been described in connection with several representative embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. An enterprise computing system, comprising:
   a process server configured to control process flow and maintain process state for a plurality of client processes;

a process database coupled to said process server, wherein said process database is configured to store process data defining one or more processes, wherein for each process, the process data defines the content and order of steps to perform that process;

a plurality of clients coupled to said process server, wherein each client is configured to display a client interface for performing steps of a respective client process, wherein each client process is one of the one or more processes defined in said processes database, wherein each client is further configured to transmit a request to said process server for each step of its respective client process, and wherein each client is configured to be able to send a request to said process server to pause its respective client process, wherein in response to the request to pause, said process server is configured to save the state of the respective client process; and a plurality of back-end systems coupled to said process server, wherein each back-end system is configured to store or manipulate data used in performing one or more steps of the one or more processes defined in the process database;

wherein for each request for a process step from one of said clients, said process server is configured to:
  access the process data defining the respective client process;
  generate a next step in the respective client process according to the state of the respective client process and the process data defining the respective client process; and
  transmit the next step to the requesting client.

2. The system as recited in claim 1, wherein said process server comprises a rules engine configured determine a next process step in response to client requests, wherein said rules engine is configured to determine the next process step according to the process data defining the process and the current state of the respective client process.

3. The system as recited in claim 2, wherein said process server further comprises:

a step display generator coupled to said rules engine, wherein said step display generator is configured to dynamically generate a mark-up language description of a next process step in response to a client request; and wherein said rules engine is configured to determine information for generating the next process step and sending the information to said step display generator.

4. The system as recited in claim 3, wherein said mark-up language description of the next process step is an eXtensible Mark-up Language (XML) description, wherein said process server is configured to send the XML description of the next process step to the requesting client.

5. The system as recited in claim 2, wherein the process server further comprises a process data manager coupled to said process database, wherein said process data manager is configured to retrieve process data required by said rules engine to determine process steps in response to client requests.

6. The system as recited in claim 5, wherein the process server further comprises a shared process context manager coupled to said process data managers wherein said shared process context manager is configured to cache process data from said process database for a plurality of respective client processes, wherein shared process context manager is configured to supply process data required by said rules engine to determine a next process step if the process data for the respective client process is cached, wherein if the process data for the respective client process is not cached, the process data is retrieved from said process database by said process data manager.

7. The system as recited in claim 1, wherein the process data for one of said processes indicates one or more business objects for accessing data in one or more of said back-end systems, wherein each business object provides an interface to one of said back-end system.

8. The system as recited in claim 7, wherein if a process step requires access to one of said back-end systems, said process server is configured to call the business object indicated by the process data.

9. The system as recited in claim 7, wherein said business objects are stored within a business object repository within said process database.

10. The system as recited in claim 1, wherein each client is configured to dynamically render the client interface for performing steps of its respective client process according to step information received from said process server, wherein said client dynamically renders a screen indicated by the step information received from said process server within a common navigational framework.

11. The system as recited in claim 1, wherein each client is configured to be able to request a next step for its respective client process from said process server.

12. The system as recited in claim 1, wherein each client is configured to be able to request a previous step for its respective client process from said process server.

13. The system as recited in claim 1, wherein each client is configured to be able to send a request said process server to assign its respective client process to a different user.

14. The system as recited in claim 1, wherein each client is configured to be able to send a request said process server to resume a paused client process, wherein in response to the request to resume, said process server is configured to send the step of the client process at the point in the process at which the process was paused.

15. The system as recited in claim 1, said process server is configured to access data from one or more of said back-end systems for each respective client process and provide said data from one or more of said back-end systems within the appropriate steps of each respective client process so that said client interface provide a common user interface for performing the respective client process regardless of which back-end systems are accessed.

16. The system as recited in claim 1, wherein said plurality of back-end systems comprise a business information database.

17. The system as recited in claim 1, wherein said plurality of back-end systems comprise an enterprise resource planning (ERP) system.

18. The system as recited in claim 1, wherein said plurality of back-end systems comprise a word processor application.

19. The system as recited in claim 1, wherein said plurality of back-end systems comprise a spreadsheet application.

20. An enterprise computing system, comprising:

a process server configured to control process flow and maintain process state for a plurality of client processes;

a process database coupled to said process server, wherein said process database is configured to store process data defining one or more processes, wherein for each process, the process data defines the content and order of steps to perform that process;

a plurality of clients coupled to said process server, wherein each client is configured to display a client interface for performing steps of a respective client process, wherein each client process is one of the one or more processes defined in said processes database, wherein each client is further configured to transmit a request to said process server for each step of its respective client process, and wherein each client is configured to be able to send a request to said process server to resume a paused client process, wherein in response to the request to resume, said process server is configured to send the step of the client process at the point in the process at which the process was paused; and a plurality of back-end systems coupled to said process server, wherein each back-end system is configured to store or manipulate data used in performing one or more steps of the one or more processes defined in the process database;

wherein for each request for a process step from one of said clients, said process server is configured to:
  access the process data defining the respective client process;
  generate a next step in the respective client process according to the state of the respective client process and the process data defining the respective client process; and
  transmit the next step to the requesting client.

21. The system as recited in claim 20, wherein said process server comprises a rules engine configured determine a next process step in response to client requests, wherein said rules engine is configured to determine the next process step according to the process data defining the process and the current state of the respective client process.

22. The system as recited in claim 21, wherein said process server further comprises:
  a step display generator coupled to said rules engine, wherein said step display generator is configured to dynamically generate a mark-up language description of a next process step in response to a client request; and
  wherein said rules engine is configured to determine information for generating the next process step and sending the information to said step display generator.

23. The system as recited in claim 22, wherein said mark-up language description of the next process step is an eXtensible Mark-up Language (XML) description, wherein said process server is configured to send the XML description of the next process step to the requesting client.

24. The system as recited in claim 21, wherein the process server further comprises a process data manager coupled to said process database, wherein said process data manager is configured to retrieve process data required by said rules engine to determine process steps in response to client requests.

25. The system as recited in claim 24, wherein the process server further comprises a shared process context manager coupled to said process data manager, wherein said shared process context manager is configured to cache process data from said process database for a plurality of respective client processes, wherein shared process context manager is configured to supply process data required by said rules engine to determine a next process step if the process data for the respective client process is cached, wherein if the process data for the respective client process is not cached, the process data is retrieved from said process database by said process data manager.

26. The system as recited in claim 20, wherein the process data for one of said processes indicates one or more business objects for accessing data in one or more of said back-end systems, wherein each business object provides an interface to one of said back-end systems.

27. The system as recited in claim 26, wherein if a process step requires access to one of said back-end systems, said process server is configured to call the business object indicated by the process data.

28. The system as recited in claim 26, wherein said business objects are stored within a business object repository within said process database.

29. The system as recited in claim 20, wherein each client is configured to dynamically render the client interface for performing steps of its respective client process according to step information received from said process server, wherein said client dynamically renders a screen indicated by the step information received from said process server within a common navigational framework.

30. The system as recited in claim 20, wherein each client is configured to be able to request a next step for its respective client process from said process server.

31. The system as recited in claim 20, wherein each client is configured to be able to request a previous step for its respective client process from said process server.

32. The system as recited in claim 20, wherein each client is configured to be able to send a request said process server to assign its respective client process to a different user.

33. The system as recited in claim 20, wherein each client is configured to be able to send a request said process server to pause its respective client process, wherein in response to the request to pause, said process server is configured to save the state of the respective client process.

34. The system as recited in claim 20, said process server is configured to access data from one or more of said back-end systems for each respective client process and provide said data from one or more of said back-end systems within the appropriate steps of each respective client process so that said client interface provide a common user interface for performing the respective client process regardless of which back-end systems are accessed.

35. The system as recited in claim 20, wherein said plurality of back-end systems comprise a business information database.

36. The system as recited in claim 20, wherein said plurality of back-end systems comprise an enterprise resource planning (ERP) system.

37. The system as recited in claim 20, wherein said plurality of back-end systems comprise a word processor application.

38. The system as recited in claim 20, wherein said plurality of back-end systems comprise a spreadsheet application.

* * * * *